United States Patent
Moffatt

(10) Patent No.: US 11,482,883 B2
(45) Date of Patent: Oct. 25, 2022

(54) TILES HAVING BUILT-IN WIRELESS POWER TRANSFER TRANSMITTER AND RECEIVER DEVICES

(71) Applicant: Etherdyne Technologies, Inc., Palo Alto, CA (US)

(72) Inventor: Robert A. Moffatt, Palo Alto, CA (US)

(73) Assignee: ETHERDYNE TECHNOLOGIES, INC., Palo Alto, CA (US)

(*) Notice: Subject to any disclaimer, the term of this patent is extended or adjusted under 35 U.S.C. 154(b) by 0 days.

(21) Appl. No.: 17/047,107

(22) PCT Filed: Apr. 19, 2019

(86) PCT No.: PCT/US2019/028293
§ 371 (c)(1),
(2) Date: Oct. 13, 2020

(87) PCT Pub. No.: WO2019/204709
PCT Pub. Date: Oct. 24, 2019

(65) Prior Publication Data
US 2021/0384763 A1 Dec. 9, 2021

Related U.S. Application Data

(60) Provisional application No. 62/660,448, filed on Apr. 20, 2018.

(51) Int. Cl.
*H02J 50/00* (2016.01)
*H02J 50/12* (2016.01)
(Continued)

(52) U.S. Cl.
CPC ............ *H02J 50/005* (2020.01); *H02J 50/12* (2016.02); *H02J 50/23* (2016.02); *H02J 50/27* (2016.02); *H02J 50/40* (2016.02); *H02J 50/70* (2016.02)

(58) Field of Classification Search
CPC .......... H02J 50/005; H02J 50/12; H02J 50/23; H02J 50/27; H02J 50/40; H02J 50/70
See application file for complete search history.

(56) References Cited

U.S. PATENT DOCUMENTS 10,044,230 B2    8/2018    Moffatt et al.
10,250,078 B2    4/2019    Moffatt et al.
(Continued)

FOREIGN PATENT DOCUMENTS

EP    2453519 A2    5/2012
GB    2528250 A    1/2016
WO    2013024388 A1    2/2013

OTHER PUBLICATIONS

International Search Report and Written Opinion for PCT/US2019/028293 dated Jul. 15, 2019.
(Continued)

*Primary Examiner* — Steven H Nguyen
(74) *Attorney, Agent, or Firm* — Perilla Knox & Hildebrandt LLP; Kenneth A. Knox

(57) ABSTRACT

A tile is provided with built in wireless power transfer technology that enables power to be wirelessly transferred from a wireless power transfer resonator of the tile to a wireless power receiver device of the tile. The wireless power receiver device includes, or is electrically coupled to, one or more electrical devices disposed on a front surface of the tile that are to be power by the receiver device. An array of the tiles may be provided in which case each tile has a wireless power transfer resonator. At least one of the tiles of the array is electrically coupled to an RF power source. The EM field generated by each tile is inductively coupled from that tile to a nearest-neighbor tile of the array.

21 Claims, 21 Drawing Sheets

(51) Int. Cl.
    *H02J 50/23*    (2016.01)
    *H02J 50/27*    (2016.01)
    *H02J 50/40*    (2016.01)
    *H02J 50/70*    (2016.01)

(56) References Cited

U.S. PATENT DOCUMENTS

| | | |
|---|---|---|
| 10,523,059 B2 | 12/2019 | Moffatt et al. |
| 2010/0237709 A1* | 9/2010 | Hall ............... B60L 53/64 307/104 |
| 2010/0259110 A1 | 10/2010 | Kurs et al. |
| 2011/0101788 A1* | 5/2011 | Sun ................ H01F 38/14 307/104 |
| 2011/0115430 A1* | 5/2011 | Saunamaki ......... H02J 7/025 320/108 |
| 2014/0021798 A1* | 1/2014 | Kesler ............. H02J 50/70 307/104 |
| 2014/0197755 A1* | 7/2014 | Willemsen ......... H02J 50/10 315/227 R |
| 2016/0126744 A1* | 5/2016 | Jeong ............... H02J 5/005 307/104 |
| 2018/0331582 A1 | 11/2018 | Moffatt |
| 2018/0351414 A1* | 12/2018 | Park ............... H02J 50/40 |
| 2020/0006987 A1 | 1/2020 | Moffatt et al. |
| 2020/0067350 A1 | 2/2020 | Moffatt |
| 2020/0212718 A1 | 7/2020 | Moffatt et al. |

OTHER PUBLICATIONS

International Preliminary Report on Patentability for PCT/US2019/028293 dated Feb. 20, 2020.

* cited by examiner

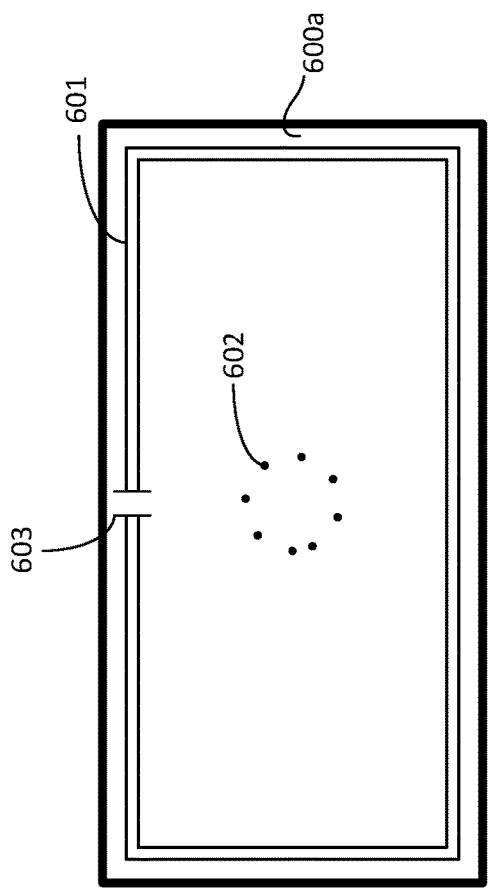
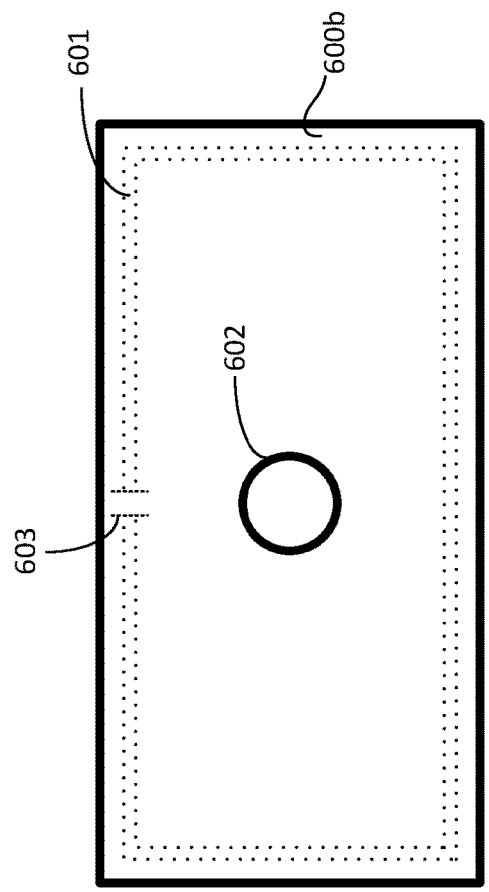
FIG. 4A
FIG. 4B

TILES HAVING BUILT-IN WIRELESS POWER TRANSFER TRANSMITTER AND RECEIVER DEVICES

CROSS-REFERENCE TO RELATED APPLICATIONS

The present application is is a 35 U.S.C. § 371 national phase application of International Application No. PCT/US2019/028293 filed Apr. 19, 2019, that claims the benefit of and priority to the filing date of U.S. Provisional Patent Application No. 62/660,448, filed on Apr 20, 2018 and entitled "TILES HAVING BUILT-IN WIRELESS POWER TRANSFER TRANSMITTER AND RECEIVER DEVICES," the contents of both of which being incorporated by reference herein in their entireties herein.

BACKGROUND

Wireless power transfer is the transmission of electrical energy from a power source to an electrical load without the use of man-made conductors to connect the power source to the electrical load. A wireless power transfer system includes a transmitter and one or more receiver devices. The transmitter is electrically coupled to a source of power and converts the power to a time-varying electromagnetic (EM) field, The one or more receiver devices receive the power via the EM field and convert the received power back to an electric current to be utilized by an electrical load that is either part of the receiver device or is electrically coupled to the receiver device.

The inventors of the present application have invented and previously filed U.S. non-provisional applications on wireless power transfer systems that include variable form factor transmitters and receiver devices for use in wireless power transfer areas. For example, U.S. application Ser. No. 15/296,704 (hereinafter the '704 application), filed on Oct. 18, 2016, entitled "WIRELESS POWER TRANSFER TI) MULTIPLE RECEIVER DEVICES ACROSS A VARIABLE-SIZED AREA," which is by the same inventors as the present application, discloses such transmitters and receiver devices.

The shape and size of such a variable form factor transmitter can be varied to accommodate virtually any sized and shaped wireless power transfer area while still achieving a particular characteristic frequency. The transmitter is configured to transmit, from a radio frequency (RF) power source that is electrically coupled to the transmitter, RF power across the wireless transfer power area via a near EM field generated by the transmitter The receiver devices that operate in the wireless power transfer area are configured to resonate at the characteristic frequency at which the transmitter is operating in order to receive power from the near EM field. The receiver devices convert the received power from the near EM field into an electrical current that can then be used to power an electrical load that is part of, or that is electrically coupled to, the receiver device.

One potential application for the wireless power transfer technology described above is lighting applications. For example, a receiver device can be configured to supply DC current to one or more light emitting diodes (LEDs s disclosed in the '704 application.

In such cases, the wireless power transfer area may extend, for example, laterally across a ceiling and slightly above and below the ceiling. Receiver devices incorporating LEDs may be disposed on the side of the ceiling that faces the floor to provide lighting for a room.

One difficulty associated with such a lighting application is that there are often electrically-conductive features or devices in, on, or above the ceiling (e.g., aluminum struts) in which eddy currents can be induced by the EM field generated by the transmitter. These eddy currents can partially or totally block the EM field, thereby reducing the effectiveness of the LED lighting solution. Similar difficulties can arise when the lighting application involves a floor, a wall, a patio, a sidewalk, a driveway, etc. Essentially, the problem can arise at any location where the surface upon which the receivers and the lighting solution are mounted is adjacent to a network of electrically-conductive elements (e.g., metal plumbing pipes, metal struts, aluminum studs, etc.) in which eddy currents can be induced.

Although wireless power lighting solutions have been proposed, they are only partially effective because they do not take into the problem caused by eddy currents in metallic objects that are within the EM field. For example, Publ. U.S. Pat App. No. 2014/0021798 to Kesler, et al. proposes building wireless resonators into various structures, such as walls, floors, ceilings, partitions, wall coverings, etc., but does not take into account problems associated with eddy currents.

Yet another difficulty associated with such a lighting application is that if the wireless transfer technology is incorporated into, for example, floor tiles or ceiling tiles that form an array, the EM field will not be uniform due to tiles at different locations in the array having different numbers of nearest-neighbor tiles. The resonators located on the tiles inductively couple mainly with the nearest-neighbor tiles. Therefore, tiles with different numbers of nearest-neighbors will have differing amounts of induced EMF depending on whether they are interior tiles (four nearest neighbors), edge tiles (three nearest neighbors), or corner tiles (two nearest neighbors). In order to maintain a uniform EM field magnitude across the entire array, these differences must be taken into account. None of the proposed wireless power lighting solutions, including that disclosed in Kesler, et al. take these differences into account. Consequently, arrays created using the known proposed techniques will not be entirely effective if they work at all.

A need exists for a lighting solution that utilizes wireless power transfer technology and that overcomes the difficulties discussed above with eddy currents and maintaining a uniform EM field.

SUMMARY

In accordance with inventive principles and concepts disclosed herein, a tile is provided that comprises a substrate having a front surface and a back surface, a wireless power transfer resonator disposed in or on the tile, and a wireless power receiver device disposed in or on the tile.

In accordance with another aspect, the tile further comprises an electrical device electrically coupled to the wireless power transfer receiver device and mounted on the front surface of the tile. The electrical device is electrically powered by the wireless power receiver device. In accordance with another aspect, the electrical device is an electrical lighting device. In accordance with another aspect, the electrical device is an electrical detector device.

In accordance with another aspect, the tile is a drop-out tile adapted for use in forming a dropped ceiling.

In accordance with another aspect, the tile further comprises a radio frequency (RE) power source electrically coupled to the wireless power transfer resonator and disposed on or in the tile.

In accordance with one or more of the foregoing aspects, the wireless power transfer resonator comprises a rectangular loop of electrically-conductive material having first, second, third and fourth segments that run adjacent to first, second, third and fourth sides, respectively, of the tile, and at least a first capacitor electrically coupled to opposite ends of the rectangular loop. The rectangular loop and at least the first capacitor are preselected to ensure that the wireless power transfer resonator resonates at a preselected characteristic frequency.

In accordance with one or more of the foregoing aspects, the wireless power receiver device resonates at the preselected characteristic frequency.

In accordance with one or more of the foregoing aspects, the wireless power transfer resonator is disposed on the back surface of the tile.

In accordance another aspect, an array of tiles arranged such that each tile has at least one neighboring tile is provided, with each tile of the array comprising a substrate having a front surface and a back surface and a first wireless power transfer resonator disposed in or on the respective tile.

In accordance with an aspect of the array of tiles, at least one of the first wireless power transfer resonators is electrically coupled to a first RF power source that is disposed on or in the tile on which the first wireless power transfer resonator is disposed.

In accordance with an aspect of the array of tiles, at leak a first tile of the array comprises at least a first wireless power receiver device disposed in or on the first tile, and an electrical device electrically coupled to the first wireless power transfer receiver device and mounted on the front surface of the tile. The electrical device is electrically powered by the first wireless power transfer receiver device. In accordance with an aspect of the array of tiles, the electrical device is an electrical lighting device. In accordance with another aspect of the array of tiles, the electrical device is an electrical detector device.

In accordance with an aspect of the array of tiles, each tile of the array is a drop-out tile adapted for use in forming a dropped ceiling.

In accordance with one or more of the foregoing aspects of the array of tiles, each of the first wireless power transfer resonators comprises a rectangular loop of electrically-conductive material having first, second, third and fourth segments that run adjacent to first, second, third and fourth sides, respectively, of the tile, and at least a first capacitor electrically coupled to opposite ends of the rectangular loop. The rectangular loop and at least the first capacitor are preselected to ensure that the first wireless power transfer resonator resonates at a preselected characteristic frequency.

In accordance with one or more of the foregoing aspects of the array of tiles, the preselected characteristic frequency of each of the first wireless power transfer resonators is preselected based at least in part on a location of the respective tile within the array. A tile located at a corner of the array has a first wireless power transfer resonator that resonates at a first characteristic frequency. A tile located in an interior of the array has a first wireless power transfer resonator that resonates at a second characteristic frequency. A tile located along a side of the array that is not a corner tile has a first wireless power transfer resonator that resonates at a third characteristic frequency. A tile that neighbors only one other tile located along a side of the array that is not a corner tile has a first wireless power transfer resonator that resonates at a fourth characteristic frequency.

In accordance with another aspect of the array of tiles, the first, second, third, and fourth characteristic frequencies are preselected to ensure that a substantially constant electromagnetic field exists across the array.

In accordance with another aspect of the array of tiles, at least a second tile of the array also has a second wireless power transfer resonator disposed thereon. The first and second wireless power transfer resonators disposed on the second tile ensure that zero net magnetic flux passes through the second tile.

In accordance with one or more of the foregoing aspects of the array of tiles, the first and second wireless power transfer resonators are coupled to one another by a crossover junction that ensures that zero net magnetic flux passes through the second tile.

In accordance with one or more of the foregoing aspects of the array of tiles, at least a third tile of the array has at least second, third and fourth wireless power transfer resonators disposed thereon. The first, second, third and fourth wireless power transfer resonators disposed on the third tile are coupled to one another by a crossover junction that ensures that zero net magnetic flux passes through the third tile.

In accordance with one or more of the foregoing aspects of the array of tiles, the array further comprises at least a second RE power source electrically coupled to at least a second wireless power transfer resonator. The second RF power source is disposed on or in the tile that the second wireless power transfer resonator is disposed in or on. The first and second RF power sources are separated from one another by a preselected distance.

In accordance with one or more of the foregoing aspects of the array of tiles, adjacent tiles in the array of tiles are separated from one another by a preselected gap that is preselected to ensure a sufficiently strong mutual inductance between the wireless power transfer resonators of the adjacent tiles.

In accordance with one or more of the foregoing aspects of the array of tiles, each rectangular loop has a width that is preselected based at least in part on a tolerance in the size of the gap.

In accordance with one or more of the foregoing aspects of the array of tiles, the first and second RF sources are in phase with one another.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4A and 4B illustrate back and front plan views, respectively, of a ceiling tile having built-in wireless power transfer technology in accordance with a representative embodiment.

DETAILED DESCRIPTION

In accordance with representative embodiment presented described herein, a tile is provided with built-in wireless power transfer technology that enables power to be wirelessly transferred from a wireless power transmitter or resonator of the tile to a wireless power receiver device of the tile. The tiles are typically arranged in an array of tiles.

One or more tiles of the array includes a wireless power receiver device, which includes, or is electrically coupled to, one or more lighting devices disposed on a front surface of the tile. Each tile of the array has a wireless power transfer transmitter or resonator. At least one of the wireless power transfer transmitters or resonators is electrically coupled to an RF power source. The EM field generated by each tile is inductively coupled from that tile to a nearest-neighbor tile of the array to couple power across the entire array.

Prior to describing the tile having built-in wireless power transfer technology, a discussion of examples of a wireless power transmitter and of wireless power receiver devices that are suitable for incorporation into a tile in accordance with a representative embodiment will be provided. It should be noted that the inventive principles and concepts are not limited to these particular configurations of a wireless power transmitter and receiver device and that other configurations may be used as well, as will be understood by persons of skill in the art in view of the description provided herein.

Figure 1:
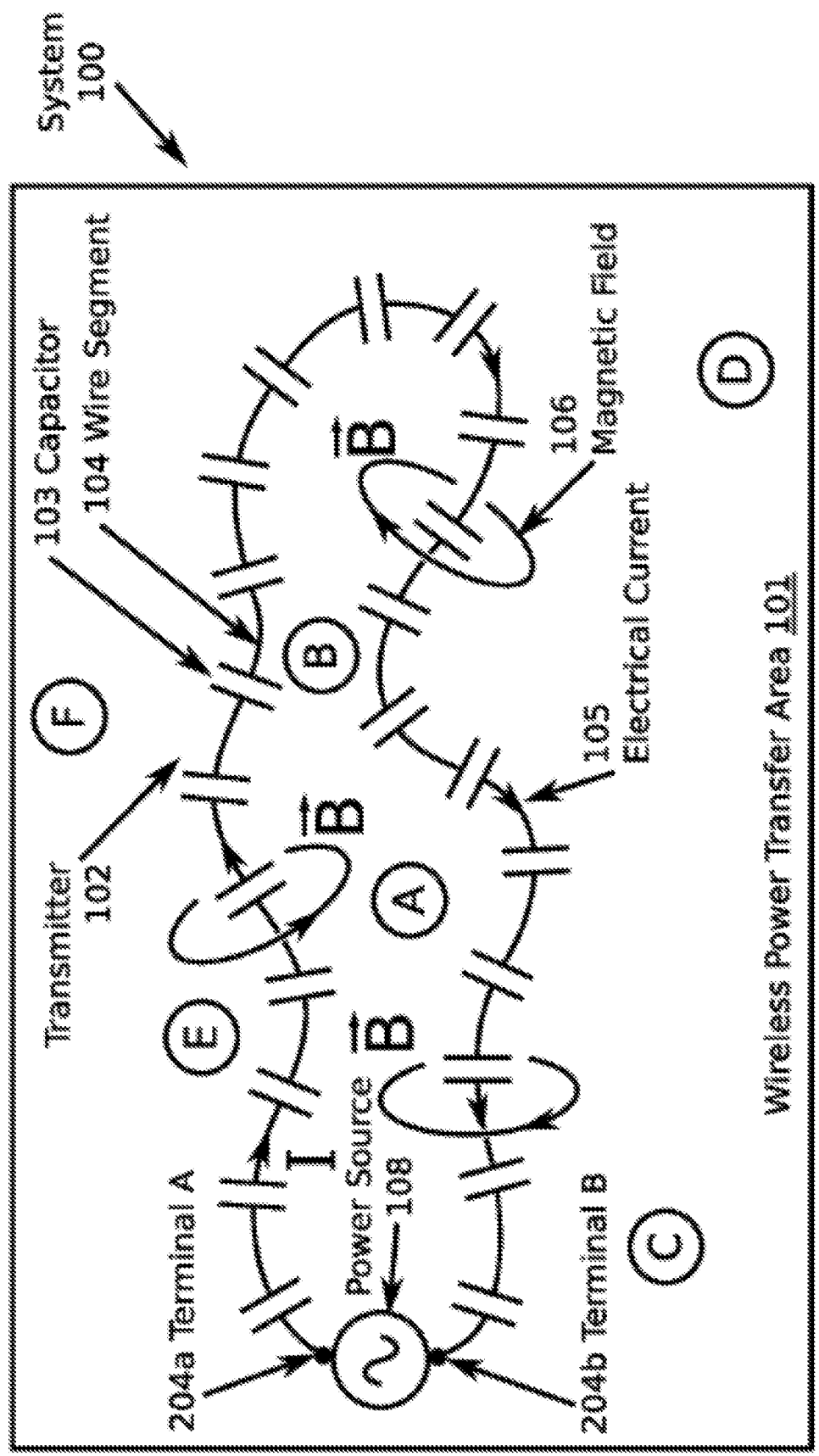
FIG. 1 is a block diagram of a wireless power transfer system that includes a variable form factor wireless power transmitter that receives power from an RF power source for wireless power transfer across a wireless power transfer area having one or more wireless power receiver devices.

FIG. 1 is a block diagram of a wireless power transfer system 100 that includes a wireless power transmitter 102 that receives power from an RF power source 108 (e.g., an RF amplifier) for wireless power transfer across a wireless power transfer area 101 having one or more wireless power receiver devices, denoted as circular icons labeled as A, B, C, E, and F, disposed therein. Each of these components is described in detail below.

In one or more embodiments of the invention, the wireless power transfer area 101 is any three-dimensional (3-D) physical space where the one or more receiver devices are receiving power from the transmitter 102. In accordance with a representative embodiment described below, the wireless power transfer area 101 includes 3-D space that extends laterally in at least first and second directions that are perpendicular to one another across a ceiling and slightly above and below the ceiling such that ceiling tiles that incorporate the wireless power transfer technology are within the wireless power transfer area.

In one or more embodiments of the invention, the receiver devices (A) through (F) are disposed in or on a ceiling tile, as will be described below in more detail. As indicated above, the receiver devices either include, or are electrically coupled to, one or more electrical devices that are to be electrically power by the electrical power received by the receiver devices. The electrical devices may be any type of electrical devices that can beneficially be powered using the electrical power transfer technology described herein. Typically electrical devices that are used for this purpose are lighting devices and detector devices disposed on the front surface of the ceiling tile. Based on the nature of the near electromagnetic field of the transmitter 102, the power of the near electromagnetic field that is not received by any of the receiver devices is returned to the transmitter 102 and the RF power source 108. This is in contrast to a far electromagnetic field via which power is radiated, resulting in energy loss that is not productive for the wireless power transfer. Examples of the receiver device are described below with reference to FIGS. 2 and 3.

In one or more embodiments of the invention, the transmitter 102 includes at least one capacitor 103. For illustrative purposes, the transmitter 102 is shown in FIG. 1 as having a string of distributed capacitors. The string of distributed capacitors includes multiple capacitor-wire segments that are connected in series to conduct RF electrical current 105 generated by the power source 108. The RF electrical current 105 induces magnetic fields (e.g., magnetic field 106) that are present throughout the wireless power transfer area 101. In one or more embodiments, the RF electrical current 105 enters/exits the wire at a terminal A and a terminal B. In one or more embodiments, additional intervening components (not shown) may also be inserted in the series of capacitor-wire segments or inserted between the series of capacitor-wire segments and one or more terminals (e.g., terminal A, terminal B) without impeding the operation of the variable form factor transmitter 102.

In one or more embodiments, each capacitor-wire segment includes a capacitor (e.g., capacitor 103) connected to a wire segment (e.g., wire segment 104). In one or more embodiments, each capacitor (e.g., capacitor 103) in the transmitter 102 has the same nominal capacitance value, as any other capacitor therein, that is determined prior to disposing the transmitter 102 in the wireless power transfer area 101. For example, the capacitors (e.g., capacitor 103) in the transmitter 102 may be installed in a factory before a user uses the transmitter 102 to provide power wirelessly within the wireless power transfer area 101. The capacitors (e.g., capacitor 103) may be of a suitable type, such as ceramic capacitors, film and paper capacitors, electrolyte capacitors, polymer capacitors, silver mica capacitors, etc. In one or more embodiments, one or more of the capacitors may include two aluminum or other metallic sheets, foils, or films separated by an aluminum or other metallic oxide layer. As is typical in a factory manufacturing process, the capacitance values of all capacitors (e.g., capacitor 103) in the transmitter 102 may vary within a range (referred to as a capacitance range), e.g., due to a manufacturing tolerance.

In one or more embodiments, each capacitor-wire segment includes a wire segment having a pre-determined segment length and a pre-determined inductance per unit length. For example, the wire segments (e.g., wire segment 104) in the variable form factor transmitter 102 may be installed in a factory before a user uses the variable form factor transmitter 102 to provide power wirelessly within the wireless power transfer area 101. The wire segments (e.g., wire segment (104)) may he of a suitable type, such as insulated or un-insulated wires, sheets, foil, or films made of copper, aluminum, or other suitable metal and/or alloy material.

As is typical in a factory manufacturing process, the length and inductance values of each and all wire segments (e.g., wire segment 104) in the variable form factor transmitter 102 may vary within a range (referred to as a length range and an inductance range), e.g., due to a manufacturing tolerance.

By confining the electrical fields, the capacitors (e.g., capacitor 103) in the transmitter 102 reduce stray electric fields and the resultant induced voltage of the wire segments (e.g., wire segment 104). Accordingly, the capacitors (e.g., capacitor 103) in the transmitter 102 reduce the fraction of energy stored in the stray capacitance of the wire segments (e.g., wire segment 104) over the total energy in the system 100. The reduction of both induced voltage and stored energy associated with the stray capacitance reduces loss due to environmental interactions and improves safety for the user.

In one or more embodiments of the invention, the transmitter 102 is associated with a characteristic frequency that is based at leak on the pre-determined capacitance, the pre-determined segment length, and the pre-determined inductance per unit length. Throughout this document, the terms "characteristic frequency" and "resonant frequency" may be used interchangeably depending on context.

In one or more embodiments, instead of the direct connection to the power source 108, the transmitter 102 receives power from the power source 108 using inductive coupling via a driving loop (not shown). In other words, the power source 108 may be directly coupled or inductively coupled to the transmitter 102.

Figure 2:
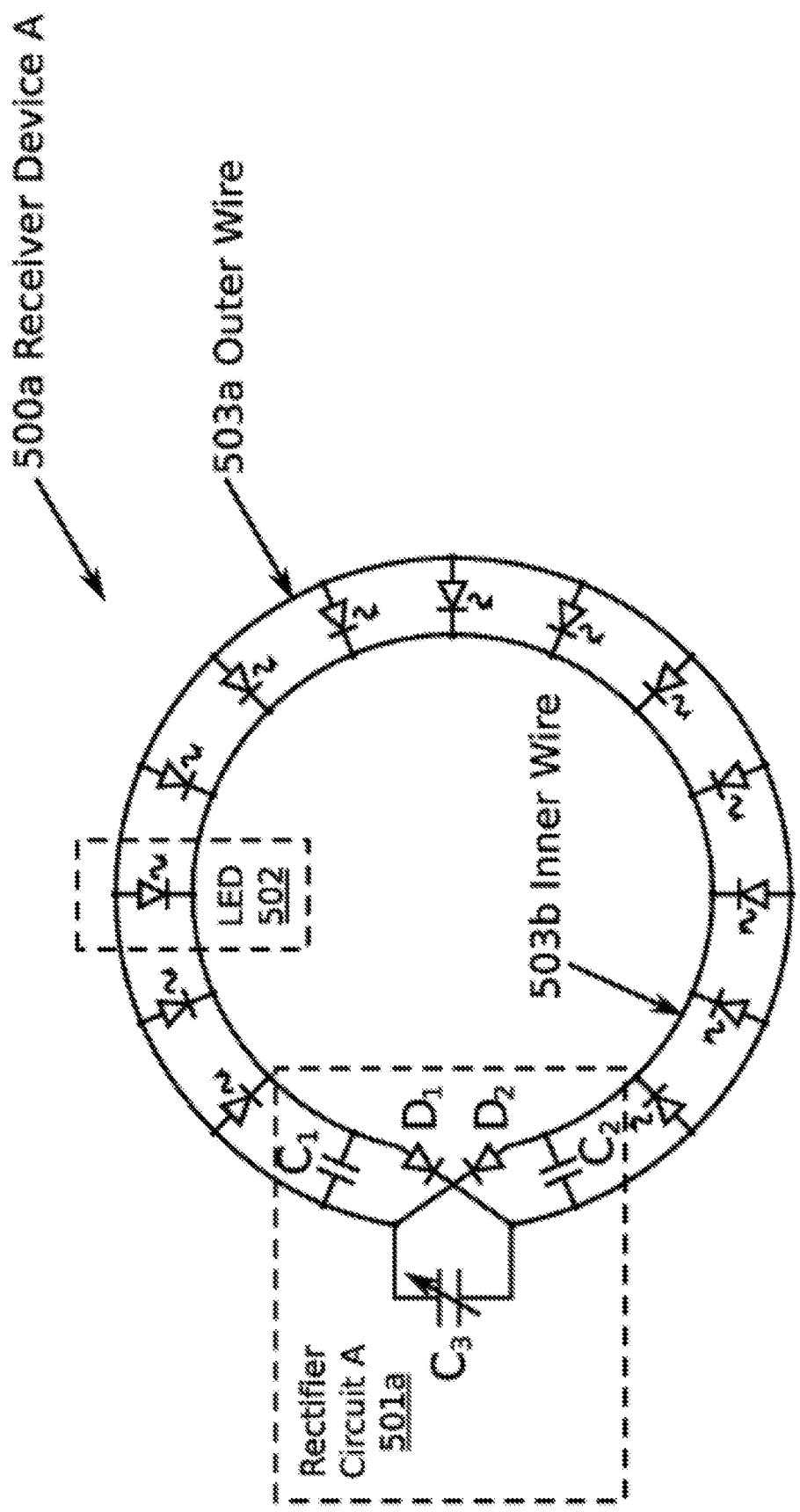
FIG. 2 shows a schematic diagram of an example receiver device in accordance with one or more embodiments of the invention.

FIG. 2 shows a schematic diagram of an example receiver device A 500a in accordance with one or more embodiments of the invention. In one or more embodiments, one or more of the modules and elements shown in FIG. 2 may be omitted, repeated, and/or substituted.

Accordingly, embodiments of the invention should not be considered limited to the specific arrangements of modules shown in FIG. 2.

In accordance with this representative embodiment, the receiver device A 500a includes the lighting solution, which is a plurality of LEDs 502 arranged in a circular pattern in this representative embodiment. The LEDs 502 are connected in parallel to form an LED string. It should be noted that the receiver device A 500a may have as few as one LED 502. The two ends of the LED string are connected to a rectifier circuit A 501a to form a loop. For example, the loop may be a circular loop used as a mobile LED lighting device used within the wireless power transfer area 101 depicted in FIG. 1. In one or more embodiments of the invention, the rectifier circuit A 501a includes capacitors $C_1$, $C_2$, and $C_3$ and rectifying diodes $D_1$ and $D_2$. When the receiver device A 500a is in the presence of the oscillating magnetic fields, the changing magnetic flux through the loop of the LED string induces a voltage difference between the two ends of the LED string. The induced voltage difference oscillates with time. The capacitance $C_3$ is adjusted to bring the LED string into resonance with the oscillating magnetic fields to enhance the induced oscillating voltage. The rectifying diodes $D_1$ and $D_2$ rectify the induced oscillating voltage to produce a DC voltage difference between the outer wire 503a and inner wire 503b of the LED string thereby deliver power to the parallel-connected LEDs 502. The capacitors $C_1$ and $C_2$ act as RF bypass capacitors to maintain the outer wire 503a and inner wire 503b of the LED string appear shorted to the RF current. The configuration of the receiver device A 500a limits the loop voltage by the combined forward voltage drop across the LEDs in series with the rectifying diode $D_1$ or $D_2$, which improves safety to the user.

Figure 3:
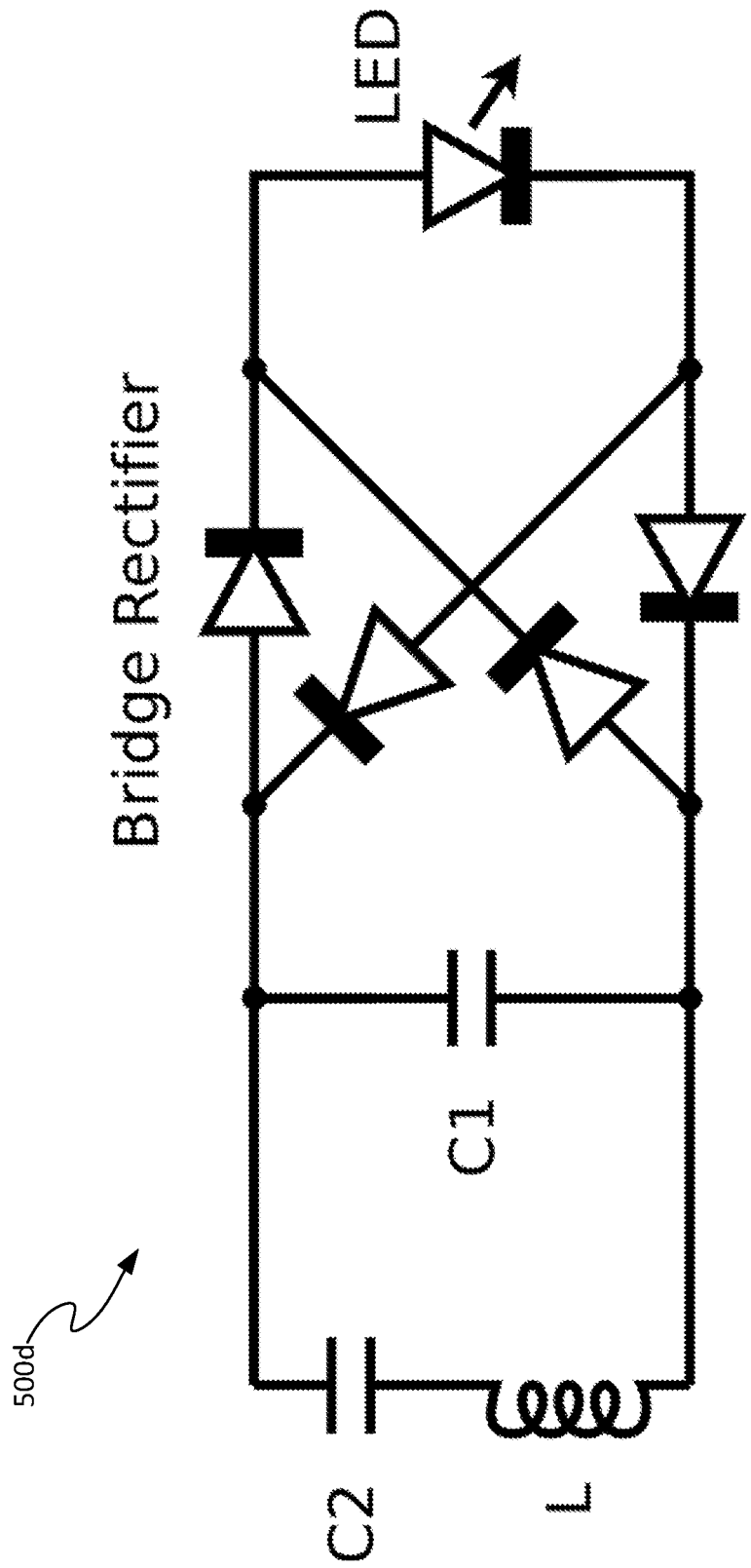
FIG. 3 shows a schematic diagram of another example receiver device in accordance with one or more embodiments of the invention.

FIG. 3 shows a schematic diagram of an additional example receiver device 500d in accordance with one or more embodiments. The inductor, L, along with capacitors. C1 and C2, are tuned to resonate at the characteristic frequency of the transmitter 102 and the RF power source 108 described in reference to FIG. 1, although the receiver device 500d is not limited to being used with the transmitter 102 and/or the RF power source 108. The value of capacitor C1 is chosen to provide an impedance match between the resonant receiver and the LED load. The bridge rectifier converts the RF voltage present on capacitor C1 into a DC voltage, which drives the LED. For example, the LED may correspond to the string of decorative light emitting diodes (LEDs).

FIGS. 1 and 2 represent examples of a wireless power transmitter 102 and a wireless power receiver device 500a, respectively, that may be built into a tile in accordance with an embodiment. FIG. 3 represents another example of a wireless power receiver device 500d that may be built into a tile in accordance with an embodiment. However, as will be described below in more detail, the transmitter that is typically used with the tiles has one or more capacitors and may have as few as a single capacitor. The configuration of the transmitter depends not only on the characteristic frequency to be obtained, but also on other factors, such as the spacing between adjacent tiles, as will be described below in more detail.

As indicated above, one difficulty associated with lighting applications that utilize wireless power transfer technology is that there are often electrically-conductive features or devices in, on, or above the ceiling (e.g., aluminum struts) in which eddy currents can be induced by the EM field generated by the transmitter. These eddy currents induce their own EM fields that can cancel out or degrade the EM fields generated by the transmitter. The following provides a solution to this problem for the case where wireless power transfer technology is incorporated into a ceiling tile.

FIGS. 4A and 4B illustrate back and front plan views, respectively, of a ceiling tile 600 for use in a dropped ceiling in accordance with a representative embodiment. The ceiling tile 600 may be a known type of drop-out ceiling tile made of a known material, such as vinyl or polystyrene, for example. Such ceiling tiles typically are manufactured as 2'×4' or 2'×2' tiles. For illustrative purposes, it will be assumed that the ceiling tiles 600 are 2'×4' ceiling tiles.

The ceiling tile 600 has a wireless power resonator 601 disposed on a back surface 600a thereof and a wireless power receiver device 602 disposed on a front surface 600b thereof. In this embodiment, the front surface 600b typically faces the floor of the building that contains the ceiling. The wireless power resonator 601 may be similar or identical to the transmitter 102 shown in FIG. 1 except that the wireless power resonator 601 is not required to be electrically coupled to its own RF power source and the form factor of the resonator 601 is fixed and is that of a rectangular loop with sides that are adjacent to respective sides of the tile 600. In accordance with this embodiment, the resonator has a single capacitor 603. The rectangular loop of the resonator 601 comprises an electrically-conductive material, such as copper, for example, which may be formed by any of the processes described above. The wireless power resonators 601 will typically have a fixed form factor, such as a flex circuit having a particular configuration and dimensions. In accordance with this embodiment, the resonator 601 has a preselected characteristic frequency that is based on the inductance of the rectangular loop comprising the resonator 601 and on the capacitance of capacitor 603. As will be understood by those of skill in the art, the width, length and/or height of the rectangular loop 604 can be preselected to have a particular inductance value and the capacitor 603 can be selected to have a particular capacitance value. Thus, the characteristic frequency of the resonator 601 can be preselected through preselection of the configuration of the rectangular loop comprising the resonator 601 and preselection of the capacitor 603 having an appropriate capacitance value.

A plurality of the tiles 600 may be positioned laterally next to one another in a grid pattern to form an array in the same manner in which such dropped ceilings are currently assembled. It should be noted, however, that the array of tiles 600 may be in any desired pattern and may have any shape. At least one of the resonators 601 of at least one of the tiles 600 of the array will be electrically coupled to an RF power source (not shown) to cause the resonator 601 to generate the EM field. The EM field will then be inductively coupled from one tile 600 to the next throughout the array. However, as indicated above, steps should be taken to ensure that the EM field amplitude remains substantially constant across the array. The manner in which that is accomplished is also described below in detail.

Figure 5:
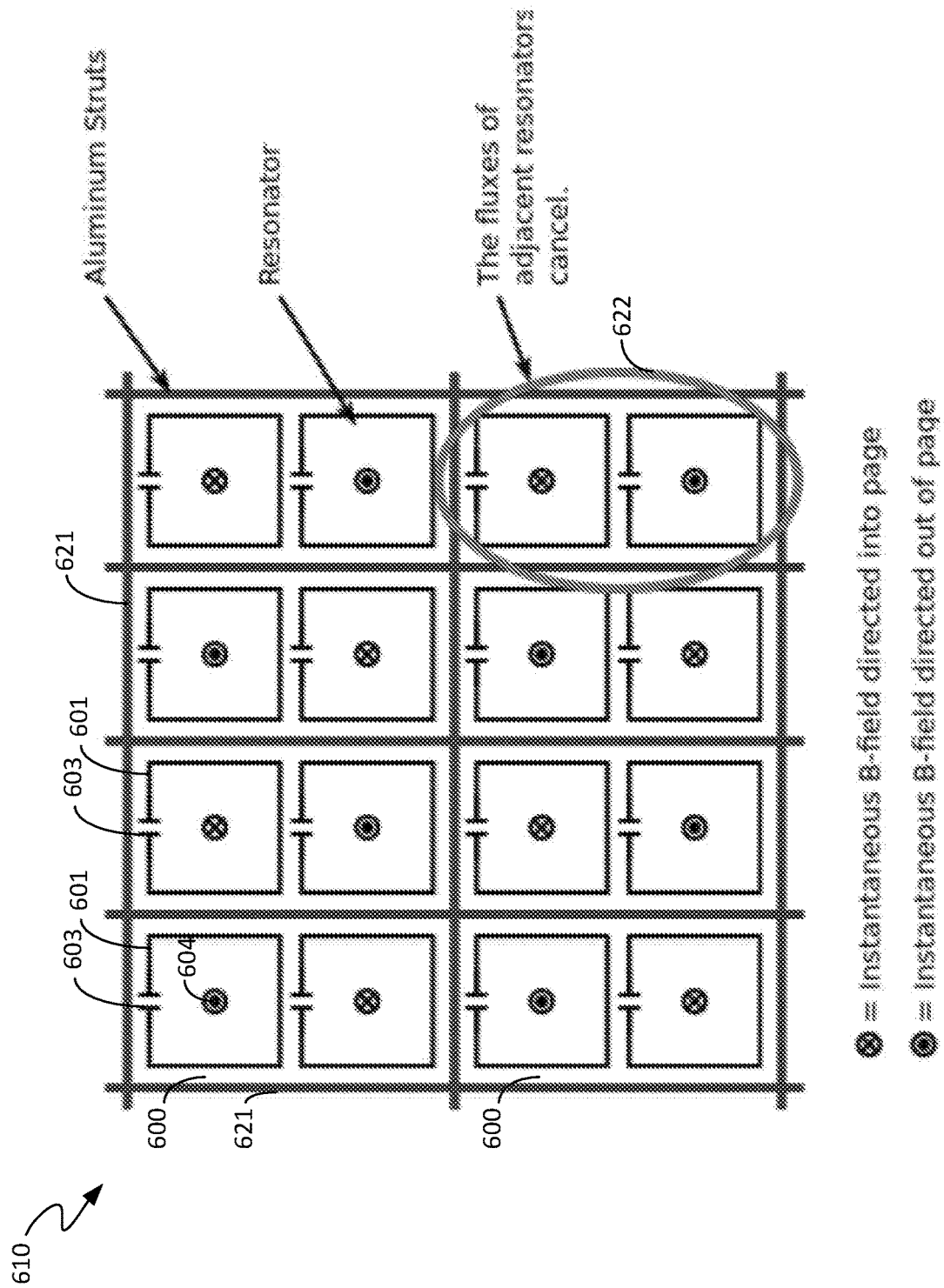
FIG. 5 illustrates a plan view of an array of ceiling tiles in accordance with an embodiment in which each ceiling tile incorporates a wireless power resonator.

FIG. 5 illustrates a plan view of an array 610 of ceiling tiles 600 in accordance with an embodiment in which each ceiling tile 600 incorporates a wireless power resonator 601. Each tile 600 also incorporates a wireless power receiver device, but the wireless power receiver devices are omitted to show the directions of the magnetic flux lines 604. For ease of illustration, each resonator 601 is represented by a rectangular loop with a capacitor 603 interconnecting ends of the rectangular loop. However, in other embodiments, the rectangular loop may have the configuration of capacitors 103 separated by wire segments 104 shown in FIG. 1. As indicated above with reference to the transmitter 102 shown in FIG. 1, the characteristic frequency of the resonator 601 is based at least on the pre-determined capacitance, the pre-determined segment length, and the pre-determined inductance per unit length. The receiver devices (not shown) tuned to the characteristic frequency. As will be described below in more detail, some of the resonators 601 may have different characteristic frequencies, depending on their positions in the array, to ensure that the magnitude of the EM field is substantially constant across the array 610.

As is typical, the ceiling tiles 600 are supported by aluminum struts 621, which form a rectangular grid. These struts 621 are electrically conducting, and they are electrically connected at the joints. Any EM field that passes through a cell in this grid will generate eddy currents in the struts 621 that will oppose that field. In accordance with an embodiment, the resonators 601 are arranged so that each cell in the grid has zero net magnetic flux passing through it. This can be accomplished by placing a pair of identical resonators 601 within each cell (because neighboring resonators have magnetic fields pointing in opposite directions when the array is driven in its lowest-frequency (i.e., fundamental mode.).

Figure 6:
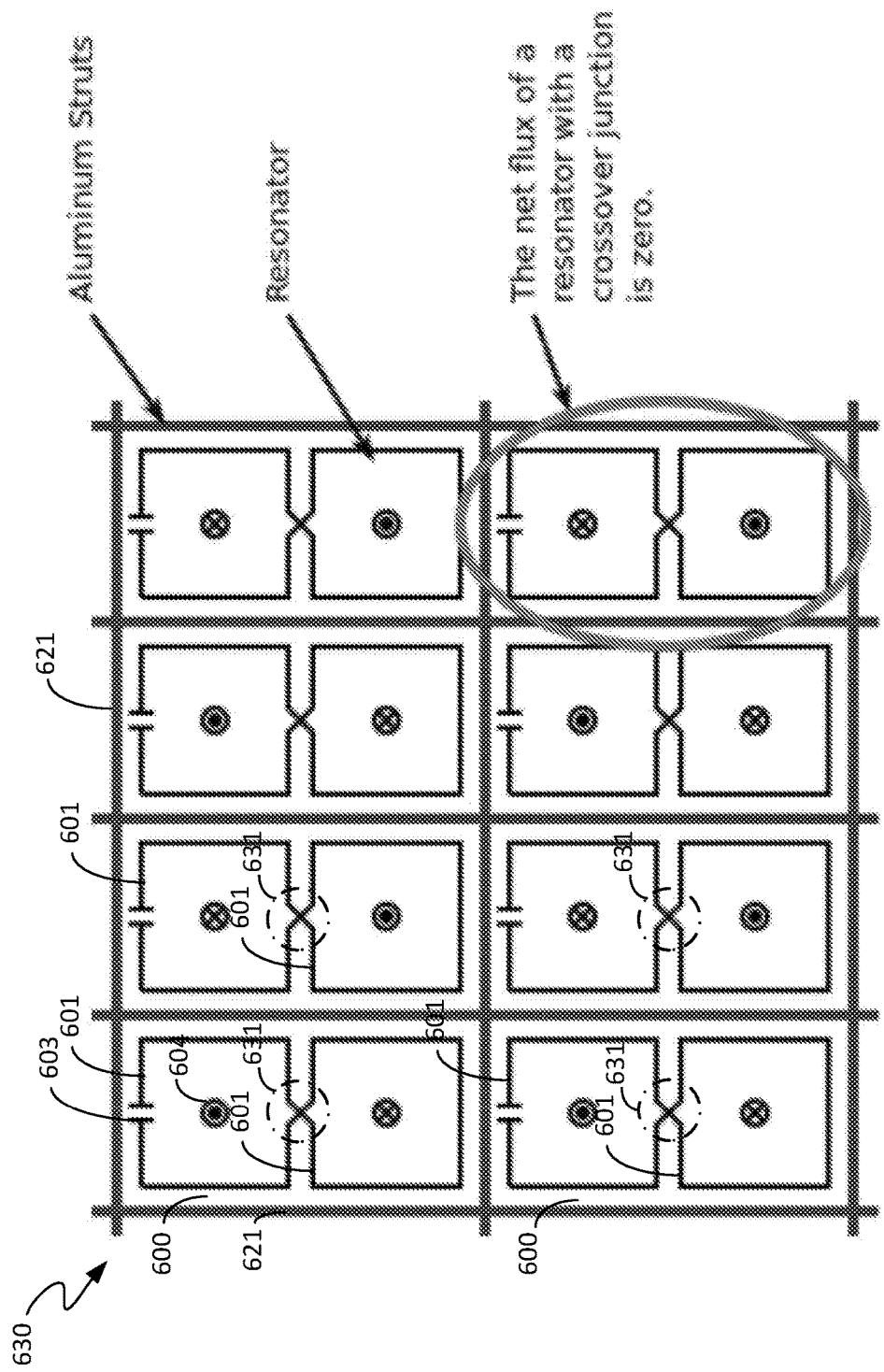
FIG. 6 illustrates a plan view of an array of ceiling tiles in accordance with an embodiment in which each cell has two identical resonators that are interconnected by a crossover junction such that it produces zero net flux.

FIG. 6 illustrates a plan view of an array 630 of ceiling tiles 600 in accordance with an embodiment in which each cell has two identical resonators 601 that are interconnected by a crossover junction 631 such that it produces zero net flux.

Figure 7:
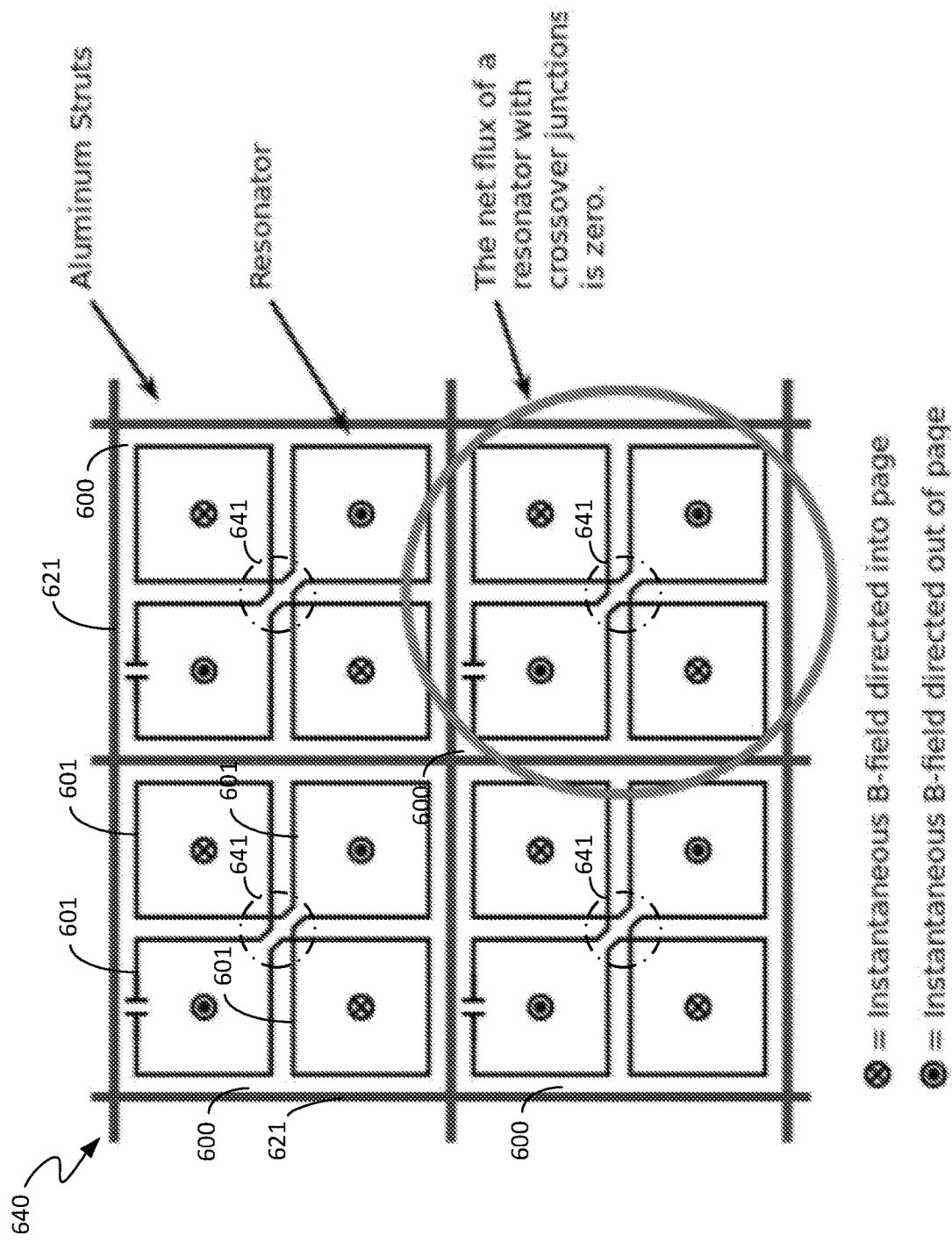
FIG. 7 illustrates a plan view of an array of 2'×2' ceiling tiles in accordance with an embodiment in which each cell has four identical resonators that are interconnected by a crossover junction such that it produces zero net flux.

FIG. 7 illustrates a plan view of an array 640 of 2'×2' ceiling tiles 600 in accordance with an embodiment in which each cell has four identical resonators 601 that are interconnected by a crossover junction 641 such that it produces zero net flux.

A rectangular array of identical resonators 601 will not have an EM field of uniform amplitude when freely oscillating in one of its natural modes. This is undesirable for wireless power transfer, because the power available to the receiving devices will not be uniform across the array, but will vary from tile to tile. In an array of identical resonators 601, the EM fields of the resonators 601 on the edges and corners of the array will have amplitudes close to zero due to those tiles having different numbers of nearest neighbors.

Figure 8:
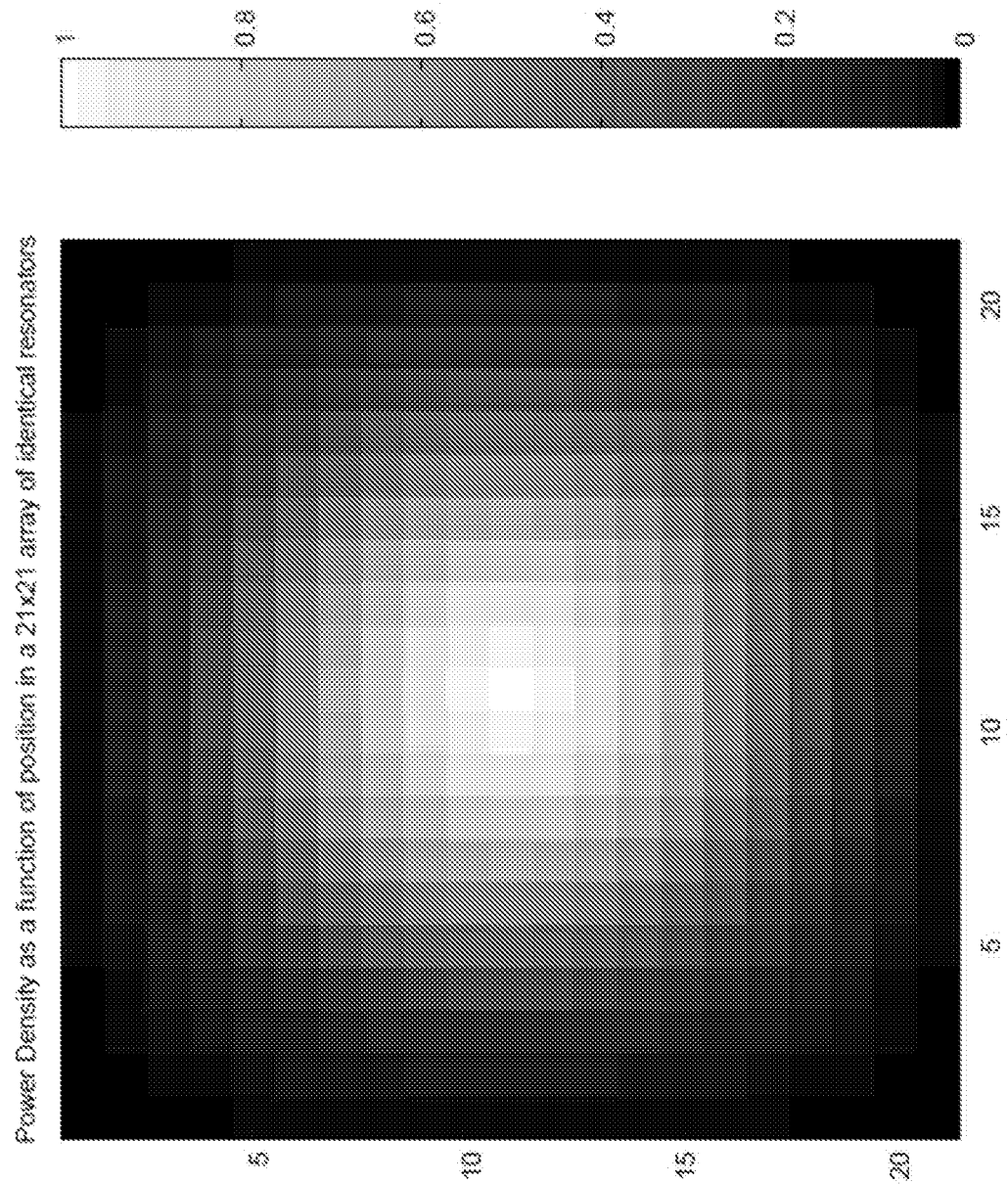
FIG. 8 illustrates a plot of the squared strength of the electromagnetic field measured at the center of each resonator when all of the resonators have the same characteristic frequency and steps are not taken to ensure that the amplitude of the EM field is substantially constant across the array.

FIG. 8 illustrates a plot of the squared strength of the EM field measured at the center of each resonator 601 when all of the resonators 601 have the same characteristic frequency and steps are not taken to ensure that the amplitude of the EM field is substantially constant across the array. The amplitude of the EM filed generated by the resonators 601 will vary smoothly with position, and reach a maximum near the center of the array. Due to inductive coupling between adjacent resonators 601, the proper choice for the intrinsic resonant frequency of each resonator 601 is determined based on its number of nearest neighbors. Letting n be the number of nearest neighbors, k be the coupling coefficient, and $f_0$ be the desired frequency of oscillation of the entire array. The intrinsic resonant frequency, f, of each tile should be tuned to be:

$$f = f_0 \sqrt{1-nk} \quad \text{(eq. 1)}.$$

For a rectangular grid, there are three distinct types of resonators 601: interior resonators (4 nearest neighbors), edge resonators (3 nearest neighbors), and corner resonators (2 nearest neighbors). When the resonators 601 are tuned according to equation (1), the amplitudes of the resonators 601 will be uniform across the array when the array is driven at frequency $f_0$, as shown in FIG. 8. This may be compared to the case where all of the resonators have identical resonant frequencies, as shown in FIG. 7. It should be noted that the frequency, $f_0$, corresponds to the frequency of the fundamental mode of the array. The reason why this is important is discussed below with reference to FIGS. 10-13.

Figure 9:
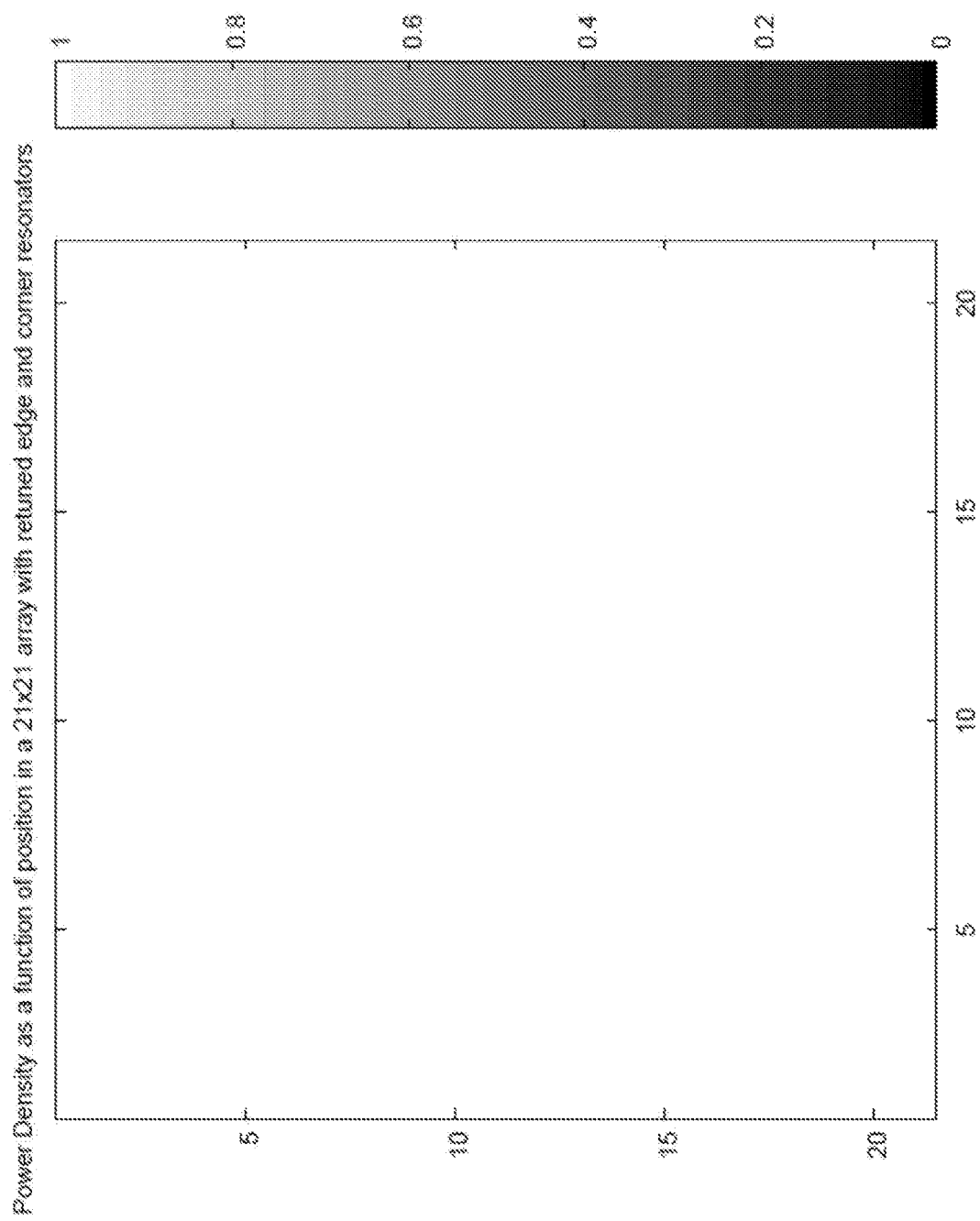
FIG. 9 illustrates a plot of the squared strength of the electromagnetic field for the case where the electromagnetic field is uniform across the array of tiles.
Figure 10:
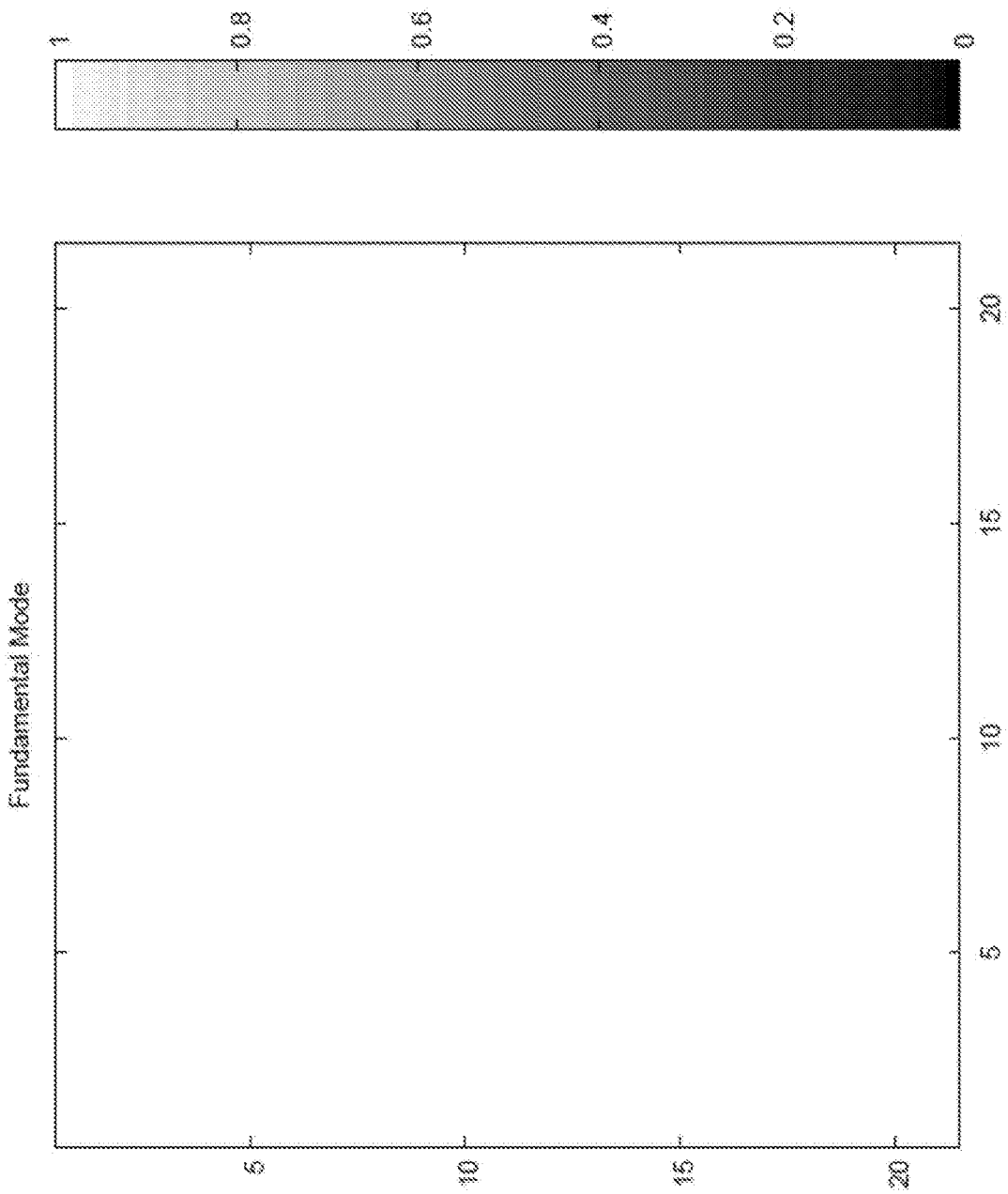
FIG. 10 illustrates a plot of the squared strength of the electromagnetic field for the fundamental mode for a uniform field magnitude across the entire array.
Figure 11:
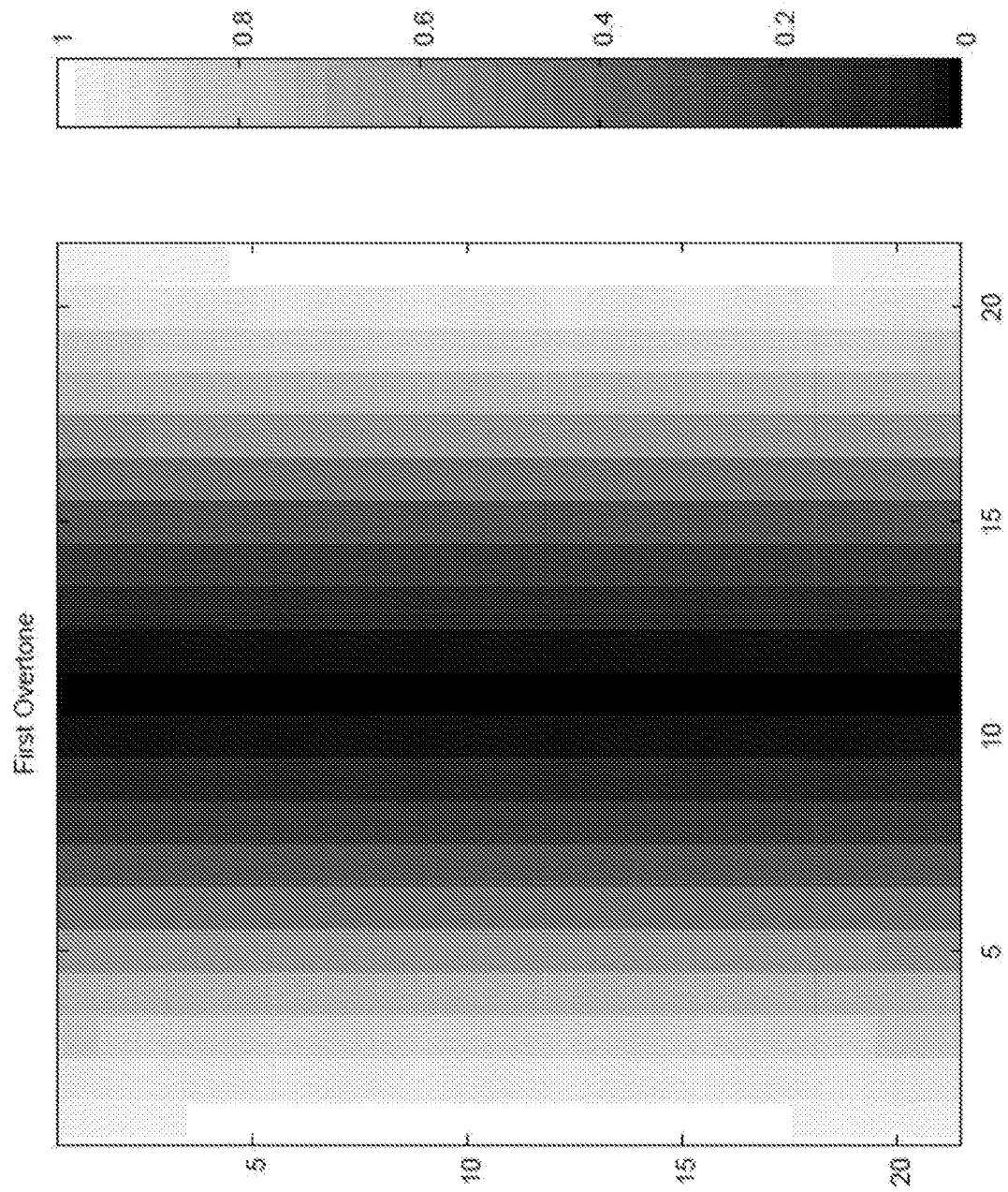
FIGS. 11-13 show the squared strength of the electromagnetic field for the first, second, and third overtones of the array.
Figure 12:
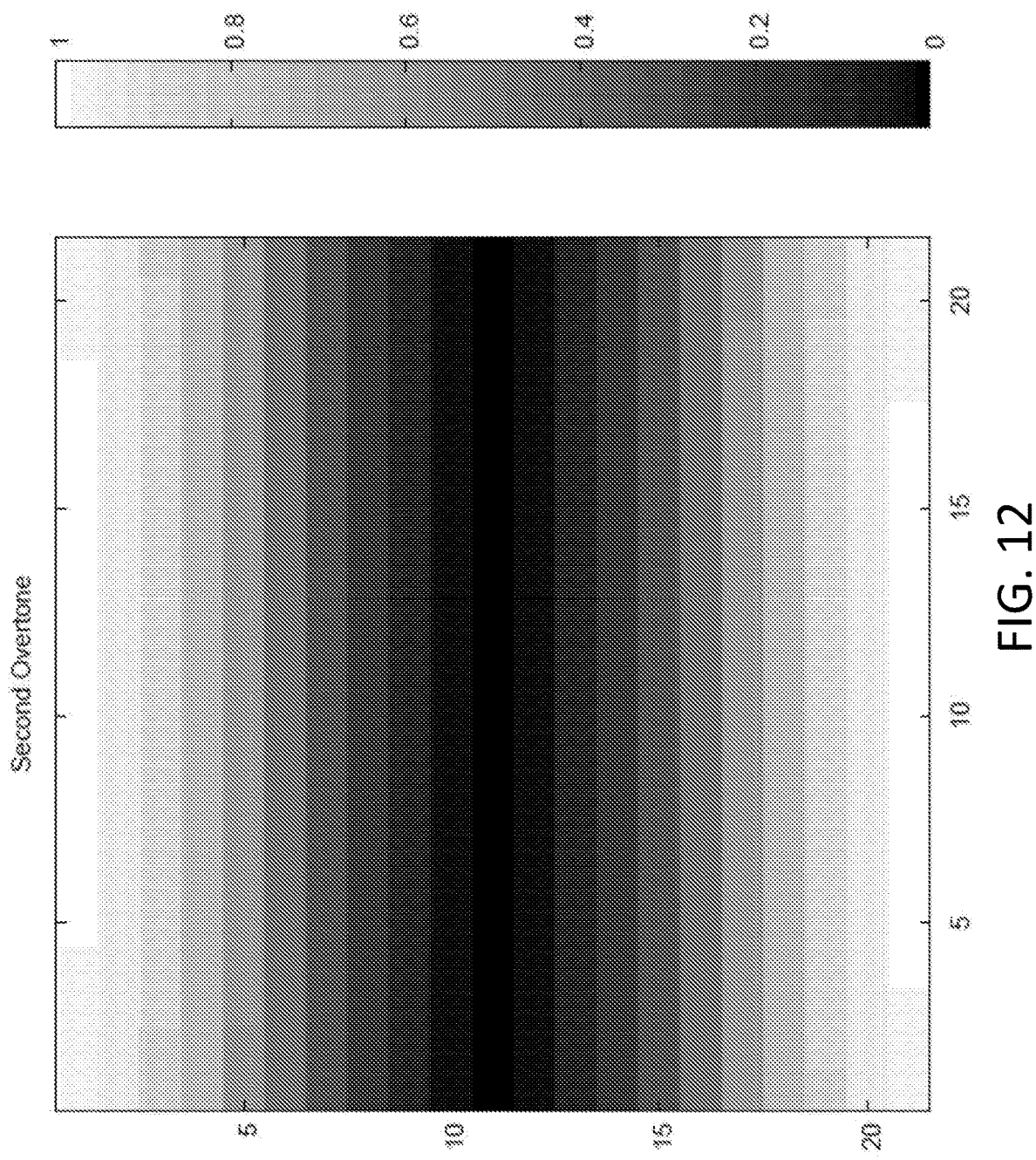
Figure 13:
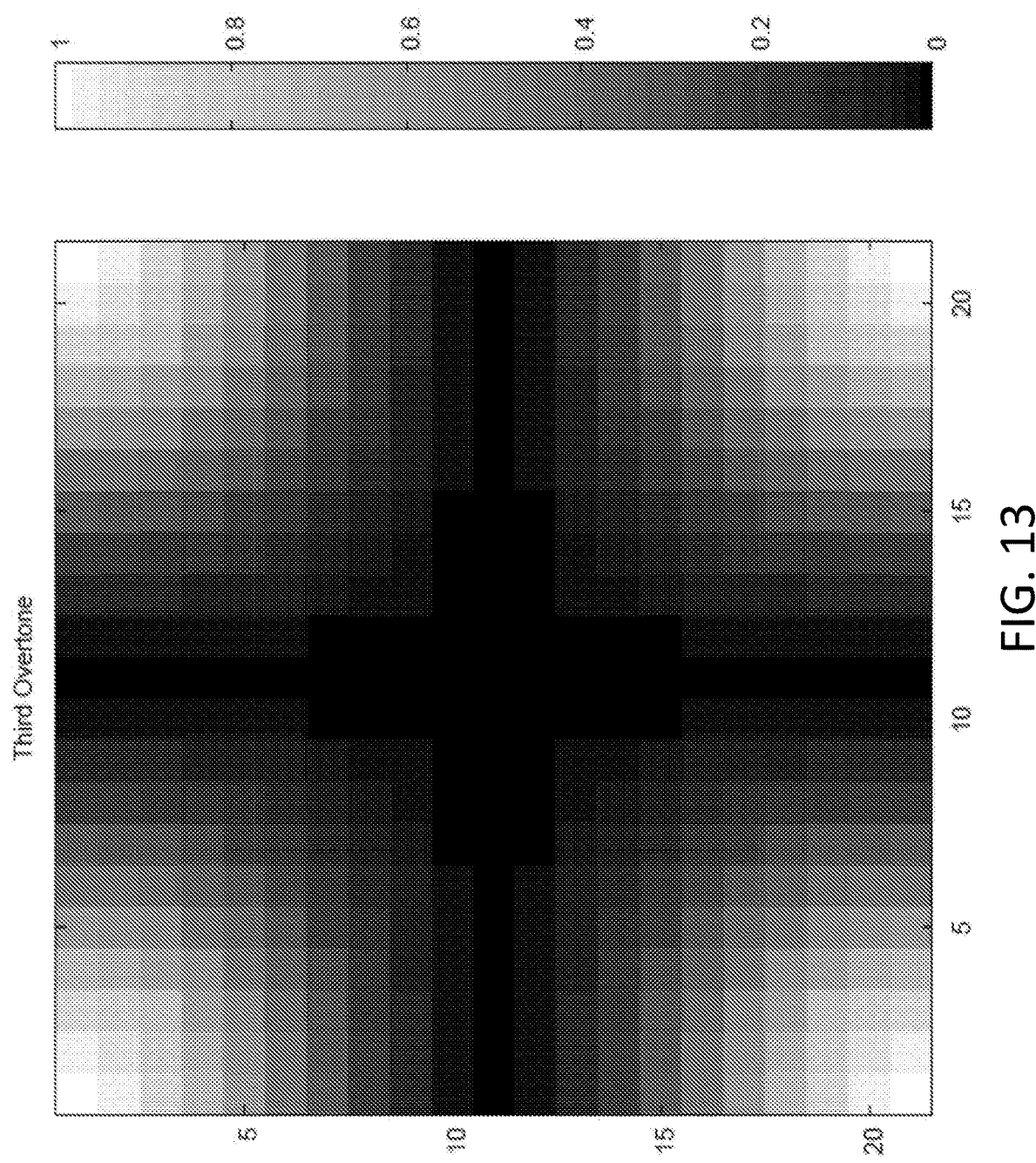

FIG. 9 illustrates a plot of the squared strength of the EM field for the case where the electromagnetic field is uniform across the array of tiles. An array of the resonators 601 will have a series of standing-wave modes. FIGS. 10-13 are plots of the squared strength of the EM field measured at the center of each resonator 601. The fundamental mode has a uniform field magnitude across the entire array, as indicated by FIG. 10. It can be seen from FIGS. 11-13 that the direction of the EM field is opposite in adjacent resonators in the fundamental mode. However, the overtones have nodal lines on which the field amplitude is zero. If the array is driven at a frequency corresponding to any overtone other than the fundamental, the array will have these nodal lines. This is undesirable for wireless power applications because receiving devices placed on the nodal lines will not receive any power. This problem is avoided by tuning the resonators 601 according to equation (1) and driving the array at the frequency, $f_0$, which is the frequency of the fundamental mode.

Another problem that needs to be solved is that the array may allow harmonics of the fundamental driving frequency to propagate. The array will have a band of resonances ranging from $f_0$ to $f_0\sqrt{(1-4k)/(1+4k)}$, where $-1/4<k<0$. The array will be driven by one or more RF amplifiers at the frequency $f_0$. Any RF amplifier connected to the system will generate some harmonics at integer multiples of $f_0$. If these harmonics are capable of propagating as waves through the array, they may cause interference to occur with other electronic devices due to the unwanted transmission of unintended frequencies.

The harmonics of $f_0$ will not propagate through the array if the lowest-frequency harmonic is higher than the upper edge of the band of resonances, or in other words if the following is satisfied:

$$f_0 = \sqrt{\frac{1-4k}{1-4k}} < 2f_0, \quad \text{(eq. 2)}$$

which is satisfied if $-0.15<k<0$.

If equation (2) is satisfied, then the array will suppress the propagation of harmonics of the driving frequency. This will enhance the purity of the driving waveform and help to prevent unintentional interference.

In the array, power is coupled from resonator 601 to resonator 601 through the mutual inductance between adjacent resonators 601. The stronger the coupling, the more effective the power transfer. The mutual inductance between neighboring resonators, M, is equal to kL, where k is the dimensionless coupling coefficient and L is the self-inductance of each resonator 601. The distance over which the power can propagate increases with increasing magnitude of k. The magnitude of the coupling coefficient may be maximized by bringing the wire composing each resonator loop as close to its neighbors as possible. For a square grid, this means the resonators 601 will be shaped as square loops of wire, or metallic ribbon, with as small a gap between the wires or ribbon as possible.

Figure 14:
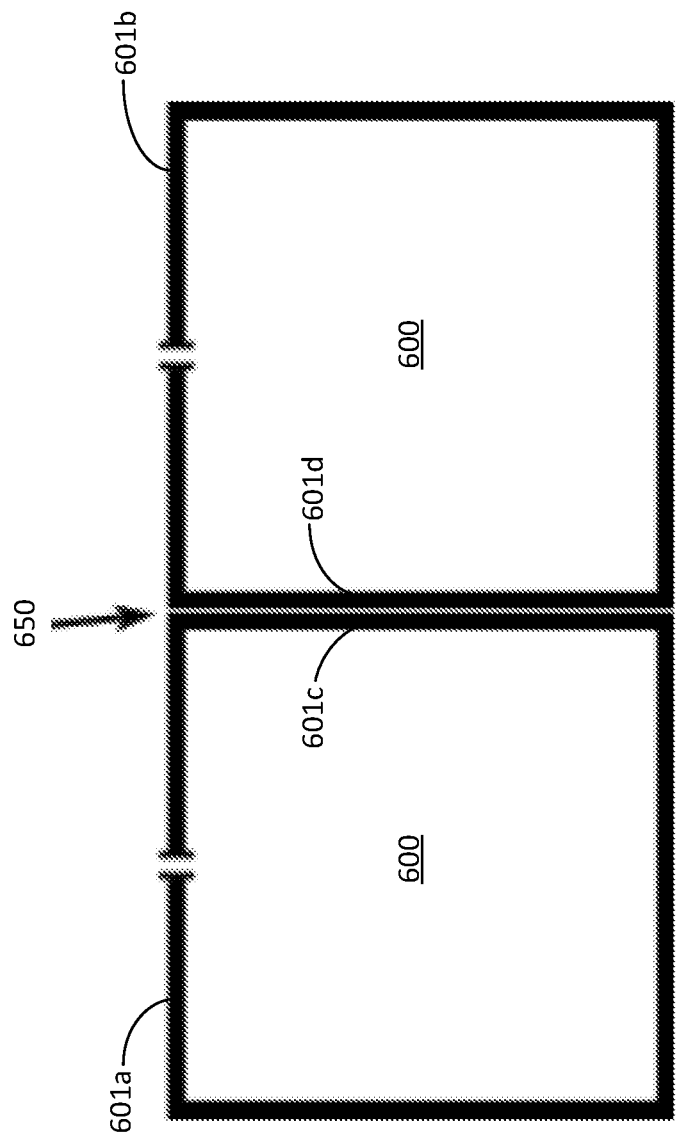
FIG. 14 illustrates two neighboring tiles and a small gap separating adjacent portions of the loops comprising the respective resonators.

FIG. 14 illustrates two neighboring tiles 600 and a small gap 650 separating adjacent portions of the loops 601*a* and 601*b* comprising the respective resonators. As the gap 650 approaches zero, the limiting value of k for adjacent squares composed of thin wire is k→−1/4. It should be noted that this limiting value exceeds the constraint imposed by equation (2). Therefore, the gap 650 should be made large enough so that k>−0.15. It should be noted, however, that the inventive principles and concepts are not limited to this range of values for k because the system will operate effectively for values of k that are outside of this range. There may be cases in which other constraints of the dropped ceiling prevent the tiles from being spaced close enough together to meet this constraint. In such situations, the mutual coupling between resonators 601*a* and 601*b* may not be maximized, but can be made sufficiently strong for the system to operate effectively.

In practice, there may be some variation in the placement of the tiles 600, and thus of the resonators 601. Dropped ceilings are designed to allow some freedom of movement of the tiles within the struts 621 (FIGS. 5-7). Consequently, the gap 650 between resonators 601 may vary due to normal tolerances of the installation process. Because the coupling coefficient k is a function of the size of this gap, the coupling coefficient k will vary randomly across the array. If this random variation is too large, it will disturb the uniformity of the magnetic field amplitude across the array. This issue may be addressed as follows. If the rectangular loops of the resonators 601 are made from, for example, a flat conducting ribbon, the ribbon width may be increased to reduce the sensitivity of the coupling coefficient k to the width of the gap 650.

Figure 15:
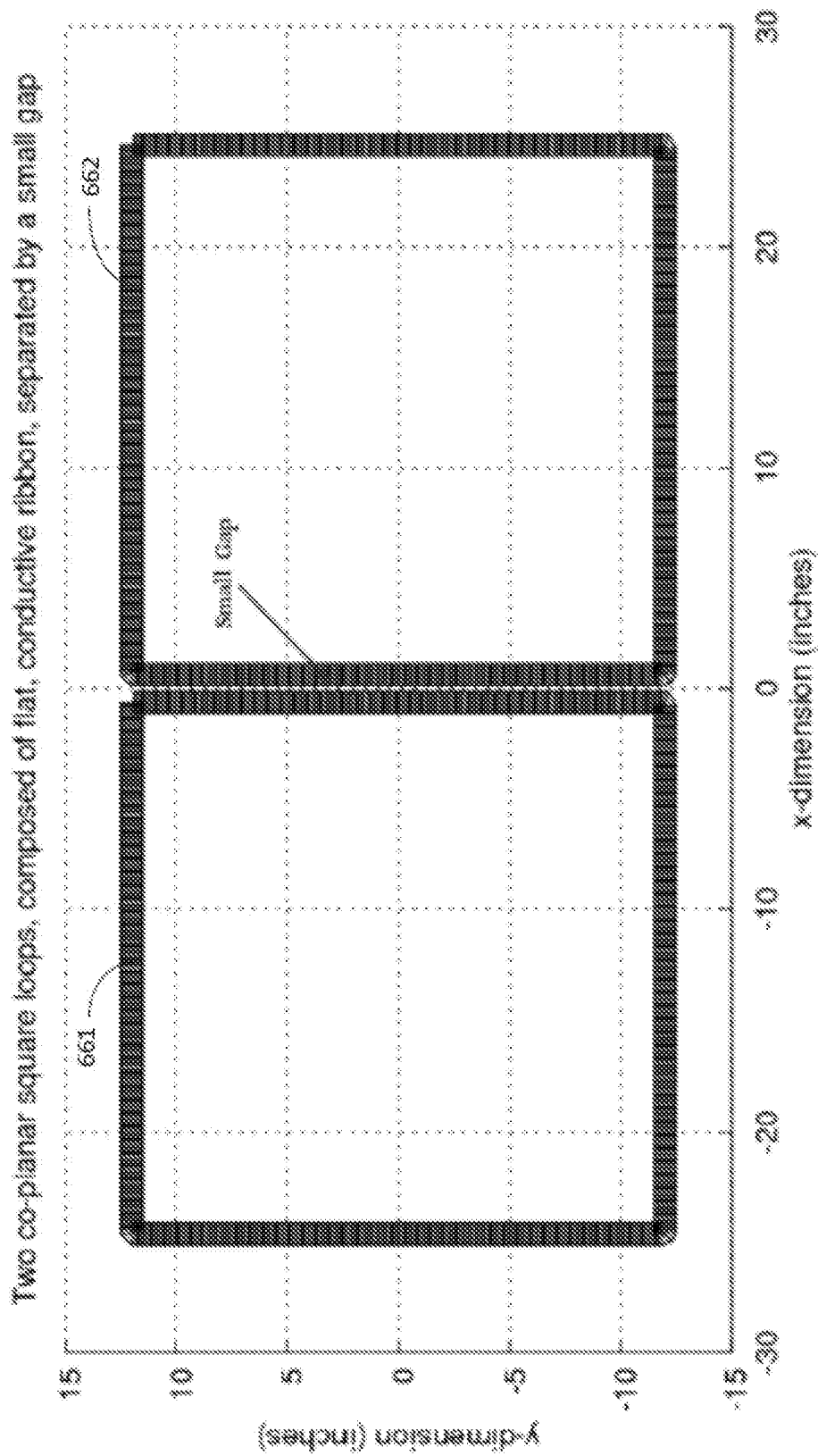
FIG. 15 shows a simulation of two adjacent electrically-conductive loops of the type that may be used in the resonators shown in FIGS. 4A and 4B in a case where the loops are made of flat, electrically-conductive ribbon separated by a small gap.
Figure 16:
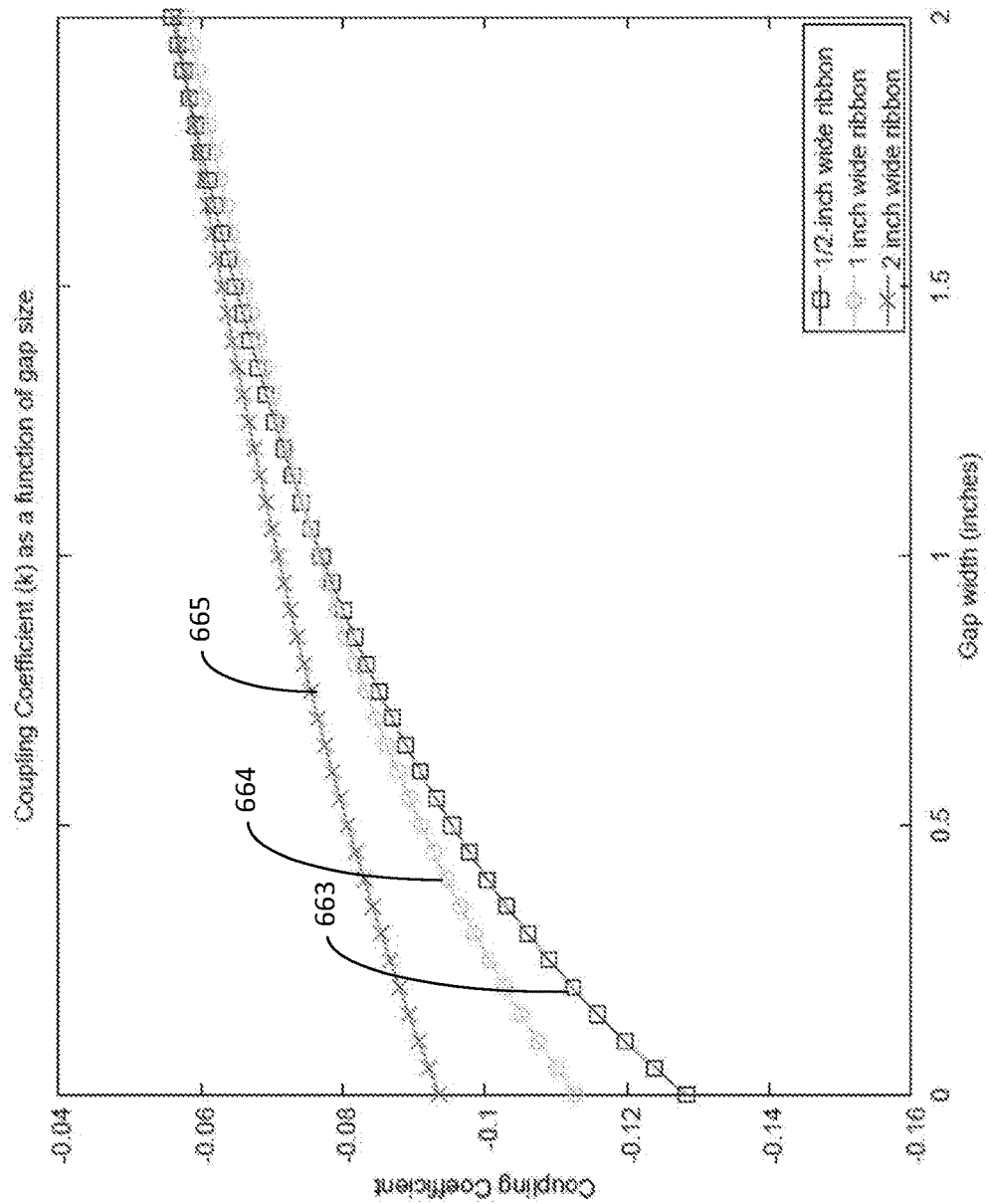
FIG. 16 shows a plot of an approximate simulation of the coupling coefficient k between the two square loops shown in FIG. 15 as a function of the gap between the two loops.
Figure 17:
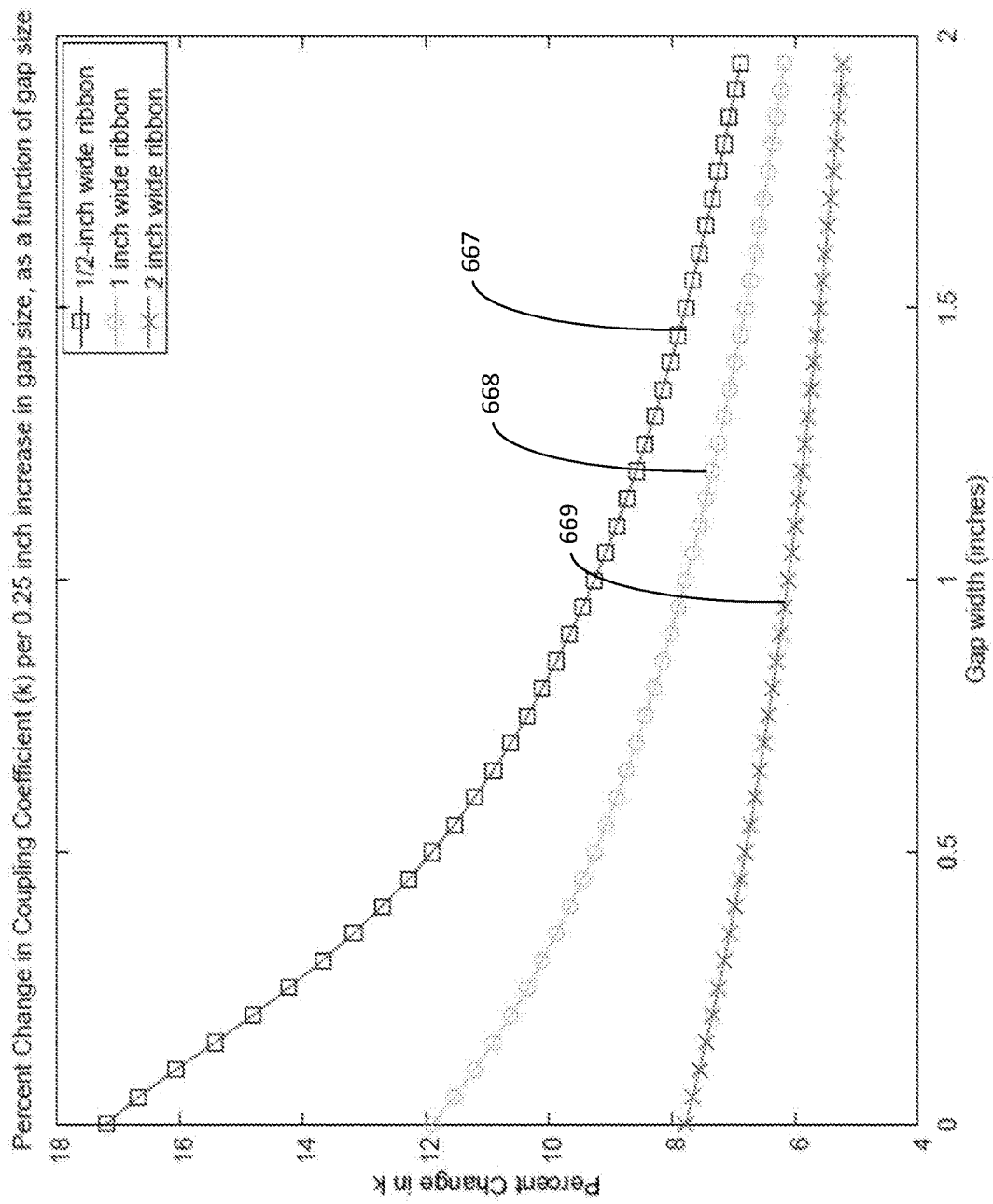
FIG. 17 shows a plot of the sensitivity of the coupling coefficient k to a change in the gap width.

FIG. 15 shows two adjacent electrically-conductive square loops 661 and 662 of the type that may be used in the resonators 601 in a case where the loops are made of flat, electrically-conductive ribbon separated by a small gap. FIG. 16 shows a plot of an approximate simulation of the coupling coefficient k between the two square loops 661 and 662 as a function of the gap between the two loops. The square loops are 24 inches across (measured center-to-center). Three ribbon widths are simulated: 1 inch, ½ inch, and 2 inch. Curves 663, 664 and 665 correspond to ¼ inch wide, 1 inch wide and 2.0 inch wide flat, electrically-conductive ribbons, respectively. FIG. 17 shows a plot of the sensitivity of the coupling coefficient k to a change in the gap width. In FIG. 17, curves 667, 668 and 669 correspond to t inch wide. 1 inch wide and 2.0 inch wide flat, electrically-conductive ribbons, respectively. It should be noted that the coupling coefficient between squares composed of wider ribbon is less sensitive to a change in the gap width than the coupling coefficient between squares composed of narrower ribbon.

The constraint described in equation (2) provides a hard constraint on the size of k. This constraint must be satisfied if it is desirable to suppress the propagation of harmonics of the fundamental driving frequency. However, there is also a soft constraint on k: larger magnitudes (i.e. more negative values of k) are more effective at transferring power across the coupled array. The characteristic length scale, λ, over which power may be transferred in the coupled array is given by:

$$\lambda = \sqrt{-\frac{kQ}{1-4k}},$$ (eq. 3)

where Q is the quality factor of each resonator, and k is the dimensionless coupling factor between each resonator and its nearest neighbors. The length scale, λ, is a dimensionless number. One unit corresponds to one grid space.

Figure 18:
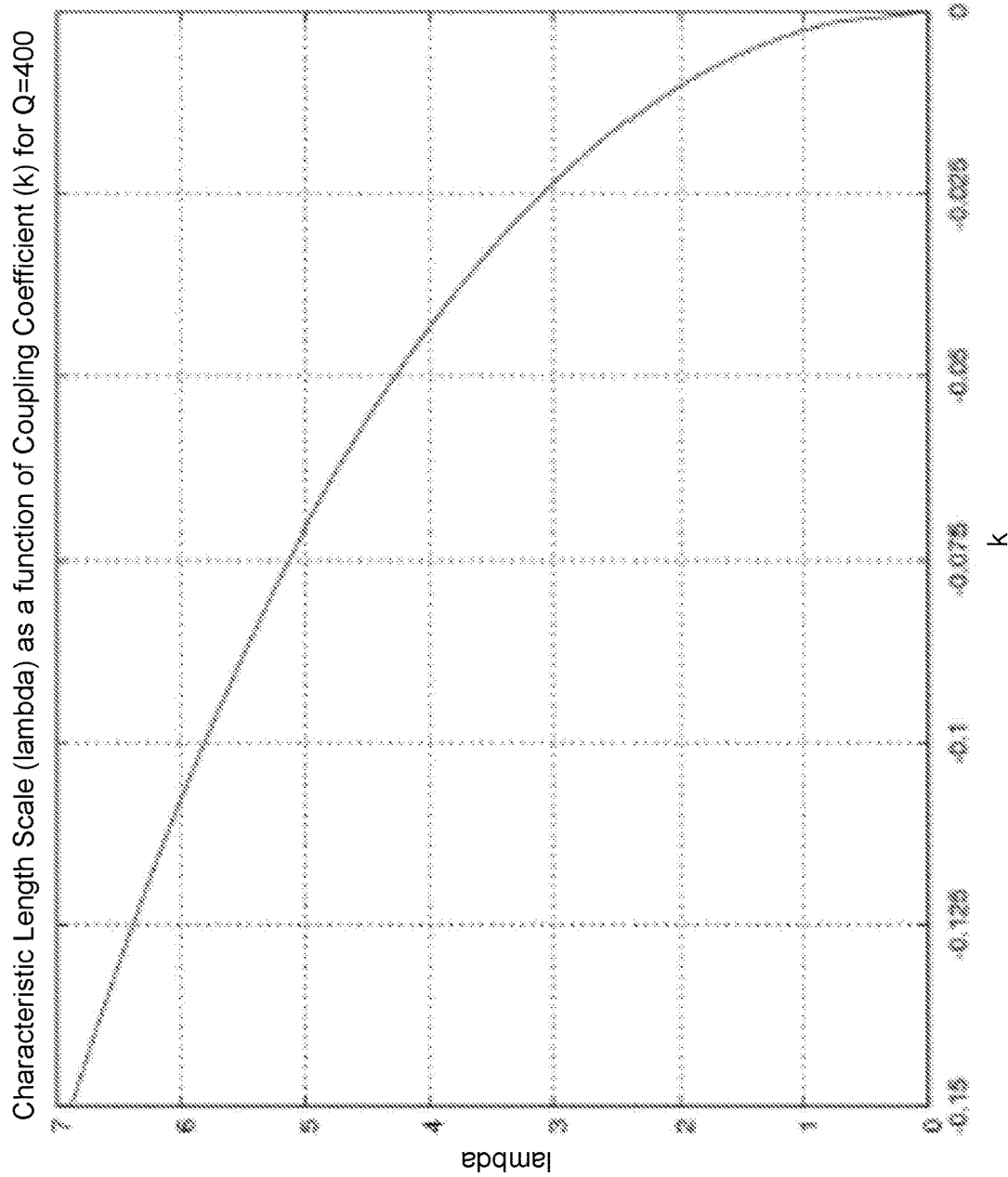
FIG. 18 is a plot of the relation between $\lambda$ and k for Q=400, which demonstrates that small magnitudes of k are undesirable because the distance over which power may be transferred approaches zero as the magnitude of k approaches zero.

FIG. 18 is a plot of the relation between λ and k for Q=400. It can be seen from the plot that small magnitudes of k are undesirable, because the distance over which power may be transferred approaches zero as the magnitude of k approaches zero. A tradeoff occurs due to the fact that, for small gap widths, the magnitude of k becomes smaller as the width of the conductive ribbon composing the resonators becomes larger. (See FIG. 16). Making the ribbon narrower increases the magnitude of the coupling coefficient, but also increases the sensitivity of the coupling coefficient to the exact spacing of the resonators 601. Making the ribbon wider reduces the sensitivity of the coupling coefficient, but also reduces the magnitude of the coupling coefficient. Therefore, in addition to the constraint defined by equation (2), there exists an additional constraint on k, namely that it should be made as large as possible while still maintaining a sensitivity to gap size below a certain allowed value. The maximum allowed sensitivity depends on the known tolerance of the gap size, which is determined by the installation process of the resonators 601.

Figure 19:
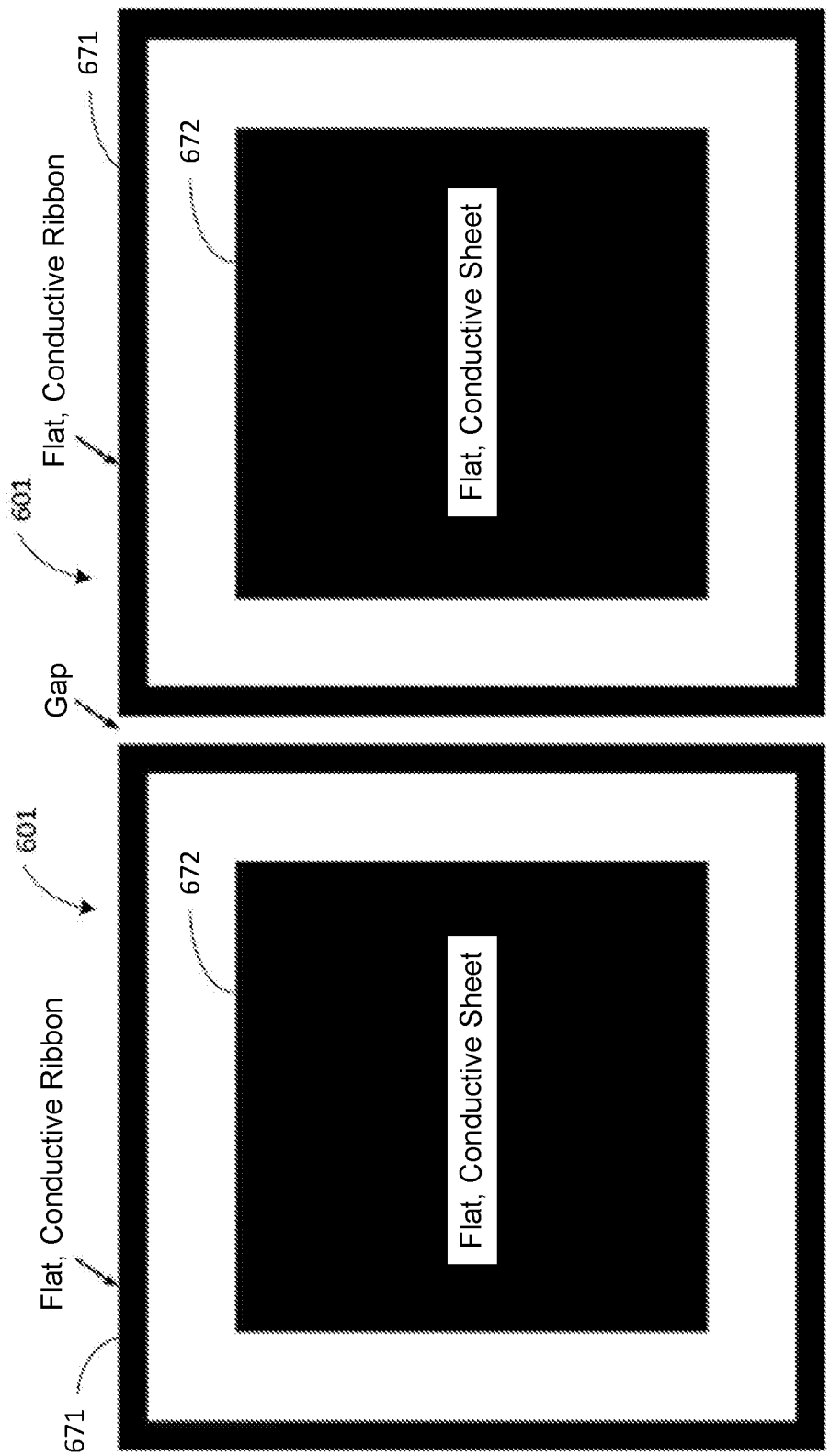
FIG. 19 depicts square loops of two adjacent resonators that each have a flat conductor in the center of the square loop for improving inductive coupling between adjacent square loops.

As indicated above, increasing the width of the ribbon conductor decreases the sensitivity of k on the gap size, but also decreases the magnitude of k, thereby reducing the characteristic length of the wireless power transfer. FIG. 19 depicts the square loops 671 of two adjacent resonators 601 that each have a flat conductor 672 in the center of the square loop 671. The coupling between adjacent square loops 671 may be increased by placing the flat conductor 672 in the center of each square resonator 601. This flat conductor 672 will concentrate the magnetic field lines near the edges of the square, where they may more effectively couple to the four nearest neighbors of the resonator 601, It should be noted that this arrangement will shield the magnetic field from penetrating into the center of each resonator 601 due to the eddy currents induced in the flat conductor 672. A wireless powered receiver device, such as device 500a or 500d in FIG. 2 or 3, respectively, for example, will therefore not receive any power if it is placed directly in contact with this flat conductor 672. This means that this solution is not applicable to all situations. However, the fact that the magnetic field is shielded from penetrating into the center of the resonator 601 may not matter in certain applications. It may be acceptable for a device to be connected directly to the resonator on each tile, such as, for example, a flat OLED panel light. Such devices could draw their power from a direct connection to each resonator without relying on inductive coupling. In other applications, it may be acceptable to limit the region of active wireless power transfer to the space between the conductive ribbon 671 and the flat conductor 672.

FIG. 2.0 illustrates a plan view of an array of the tiles 600 shown in FIGS. 4A and 4B having four RF amplifiers 770 for driving the resonators 601. As indicated above, at least one of the resonators 601 is electrically coupled (directly or inductively) to an RF amplifier 770. The resonators 601 that are electrically coupled to an RF amplifier 770 generate an EM field that is then electromagnetically coupled to the nearest-neighbor resonators 601, and so on, to couple the field across the entire array. The following demonstrates considerations that should be taken into account in determining the number of RF amplifiers 770 that are needed for a given array of a given size and the spacing between the RF amplifiers 770.

Figure 20:
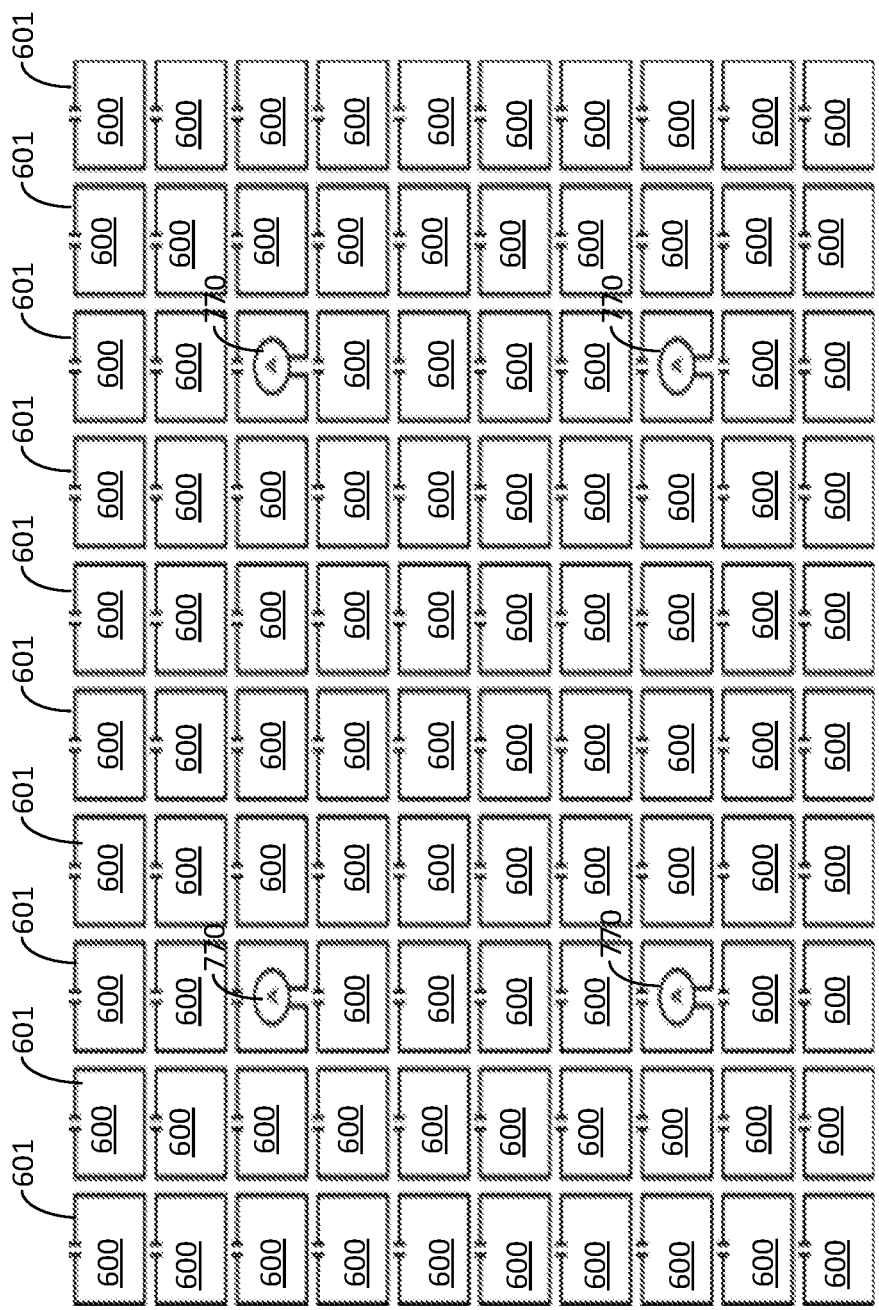
FIG. 20 illustrates a plan view of an array of the tiles shown in FIGS. 4A and 4B having four RF amplifiers for driving the resonators of the tiles.

The example shown in FIG. 20 assumes that the resonators 601 form a square grid, and that RF amplifiers 770 are attached to some of the resonators 601 to provide power. The RF amplifiers 770 are evenly spaced on a square grid with a distance of s squares between amplifiers, where s is a positive integer. In the example shown in FIG. 20, there is a distance of 5 squares between amplifiers 770, i.e., s=5.

The power density generated by an RF amplifier 770 connected to a single resonator 601 decays exponentially with distance from the RF amplifier 770. The characteristic length of this exponential decay is given above by equation (3). If the scale of the coupled array is larger than the characteristic length defined by equation (3), then the power density of the array will not be uniform. One way to ensure such uniformity is to drive the array at multiple points by multiple RF amplifiers 770, each attached to a single resonator 601. The spacing between RF amplifiers 770 may be chosen so that it is of the same order as in order to ensure the uniformity of the power density.

However, if the array is driven by multiple independent RP amplifiers 770, the RE amplifiers 770 will naturally operate at different frequencies and/or phases. The lack of synchronization between independent RE amplifiers 770 will cause beat notes to appear in the combined field generated by the RF amplifiers 770. For example, if two independent RF amplifiers 770 differ in frequency by 10 Hz, a visible 10 Hz flicker will be seen in any wirelessly-powered lights that are placed between the two RF sources. For that reason, the RF amplifiers 770 should be locked in phase in order to eliminate the generation of these beat notes. The phase-locking may be achieved by distributing a master clock signal to all of the RF amplifiers 770. Phase-locking may also be achieve by injection locking between all of the RF amplifiers 770 present in the system.

Figure 21:
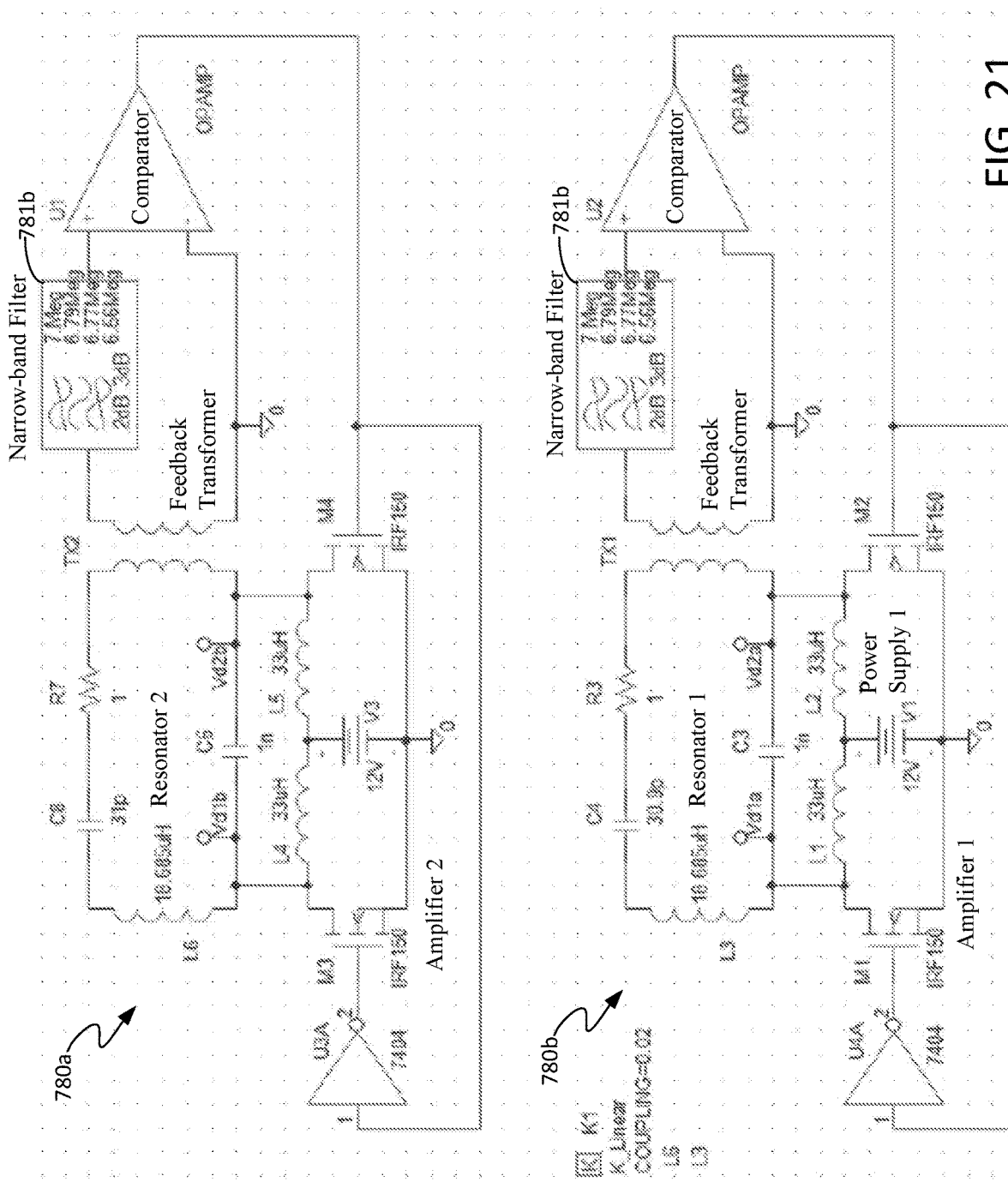
FIG. 21 illustrates a schematic diagram that shows two identical sources of RF power that are locked in phase through injection phase-locking.

FIG. 21 illustrates a schematic diagram that shows two identical RF power sources 780a and 780b that operate in phase with one another. The RF amplifiers 770 shown in FIG. 20 can be implemented as the RF sources 780a and 780b shown in FIG. 21. Each source 780a and 780b contains positive feedback coupled through a narrow band-pass filter 781a and 781b, respectively, The positive feedback causes oscillation, and the filters 781a and 781b set the frequency of the oscillation. The two RF power sources 780a and 780b have a weak coupling to each other. This coupling causes some of the RF from the first source 780a to leak into the second source 780b, where it becomes part of the feedback loop. This injection of RF from one source into the feedback loop of the other causes the two sources 780a and 780b to oscillate with the same phase. The schematic shown in FIG. 21 is merely one example of a technique and circuit configuration that can be used to ensure that the RF amplifiers 770 are operating in phase.

It should be noted that while the inventive principles and concepts have been described above for exemplary purposes with reference to ceiling tiles, the inventive principles and concepts apply equally to other types of tiles that are located side-by-side to form an array of tiles, including floor tiles, patio pavers, side walk and driveway pavers, decorative tiles used on walls (e.g., in backsplashes), outdoor tiles used on balconies and porches, etc. In more general (i.e. non-rectangular) configurations, there will be four different types of tiles, having four different intrinsic resonant frequencies: namely tiles which have either 4, 3, 2, or 1 nearest neighbors.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure, Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a plurality of tiles, wherein each of the plurality of tiles comprises:
        a substrate having a front surface and a back surface;
        a wireless power transfer resonator disposed in or on a respective one of the plurality of tiles, the wireless power transfer resonator having a preselected characteristic frequency and generating an electromagnetic (EM) field; and
        a wireless power receiver device disposed in or on the respective one of the plurality of tiles, the wireless power receiver device being tuned to the preselected characteristic frequency such that the EM field generated by the wireless power transfer resonator is inductively coupled to the wireless power receiver device,
        wherein the wireless power transfer resonator of a first one of the plurality of tiles is tuned to a first preselected characteristic frequency and the wireless power transfer resonator of a second one of the plurality of tiles is tuned to a second preselected frequency different than the first preselected characteristic frequency, the first preselected characteristic frequency and the second preselected frequency preselected such that a substantially constant electromagnetic field is generated across an array of the plurality of tiles.

2. The system of claim 1, further comprising:
    an electrical device electrically coupled to the wireless power transfer receiver device and mounted on the front surface or the back surface of the tile, the electrical device being electrically powered by the wireless power receiver device,
    wherein the electrical device is one of an electrical lighting device, an electrical detector device, and
    wherein the tile is a drop-out tile adapted for use in formed a dropped ceiling.

3. The system of claim 1, wherein the tile further comprises:
a radio frequency (RF) power source electrically coupled to the wireless power transfer resonator, the RF power source being disposed on or in the tile.

4. The system of claim 1, wherein the wireless power transfer resonator comprises:
    a rectangular loop of electrically-conductive material having first, second, third and fourth segments that run adjacent to first, second, third and fourth sides, respectively, of the tile; and
    at least one capacitor electrically coupled to opposite ends of the rectangular loop, wherein the rectangular loop and the at least one capacitor are preselected to ensure that the wireless power transfer resonator resonates at a preselected characteristic frequency.

5. The system of claim 1, wherein the wireless power receiver device resonates at the preselected characteristic frequency.

6. The system of claim 1, wherein the wireless power transfer resonator is disposed on the back surface of the tile.

7. A wireless power device for powering at least one load, comprising:
    an array of tiles arranged such that each tile has at least one neighboring tile, each tile of the array comprising:
        a substrate having a front surface and a back surface; and
        a first wireless power transfer resonator disposed in or on the respective tile, each first wireless power transfer resonator having a preselected characteristic frequency and generating an electromagnetic (EM) field that is inductively coupled to the first wireless power transfer resonator of a neighboring tile
        wherein the first wireless power transfer resonator of the respective tile is tuned to the preselected characteristic frequency different than a preselected characteristic frequency of other tiles in the array of tiles, the preselected characteristic frequency of the respective tile and the preselected characteristic frequency of the other tiles in the array of tiles being preselected such that a substantially constant electromagnetic field is generated across the array of tiles.

8. The wireless power device of claim 7, wherein at least one of the first wireless power transfer resonators is electrically coupled to a first radio frequency (RF) power source, the first RF power source being disposed on or in the tile on which said one of the first wireless power transfer resonators is disposed.

9. The wireless power device of claim 8, wherein at least a first tile of the array comprises:
    at least a first wireless power receiver device disposed in or on the first tile; and
    an electrical device electrically coupled to the first wireless power transfer receiver device and mounted on the front surface or the back surface of the tile, the electrical device being electrically powered by the first wireless power transfer receiver device.

10. The wireless power device of claim 9, wherein:
    the electrical device is an electrical lighting device;
    the electrical device is an electrical detector device; or
    each tile is a drop-out tile adapted for use in forming a dropped ceiling.

11. The array wireless power device of claim 7, wherein the first wireless power transfer resonator comprises:
    a rectangular loop of electrically-conductive material having first, second, third and fourth segments that run adjacent to first, second, third and fourth sides, respectively, of the tile; and
    at least one capacitor electrically coupled to opposite ends of the rectangular loop, wherein the rectangular loop and the at least capacitor are preselected to ensure that the first wireless power transfer resonator resonates at the preselected characteristic frequency.

12. The wireless power device of claim 7, wherein the preselected characteristic frequency of each of the first wireless power transfer resonators is preselected based at least in part on a location of the respective tile within the array, wherein:
    a tile located at a corner of the array has a first wireless power transfer resonator that resonates at a first characteristic frequency;
    a tile located in an interior of the array has a first wireless power transfer resonator that resonates at a second characteristic frequency;
    a tile located along a side of the array that is not a corner tile has a first wireless power transfer resonator that resonates at a third characteristic frequency;
    a tile that neighbors only one other tile that has a first wireless power transfer resonator that resonates at a fourth characteristic frequency; and
    the first characteristic frequency, the second characteristic frequency, the third characteristic frequency, and the fourth characteristic frequency are each different from one another.

13. The wireless power device of claim 12, wherein the first characteristic frequency, the second characteristic frequency, the third characteristic frequency, and the fourth characteristic frequency are different from one another and are each preselected to ensure that a substantially constant electromagnetic field exists across the array.

14. The wireless power device of claim 7, further comprising:
    at least a second tile of the array that has a second wireless power transfer resonator disposed thereon, wherein the first and second wireless power transfer resonators disposed on the second tile ensure that zero net magnetic flux passes through the second tile.

15. The wireless power device of claim 14, wherein the first wireless power transfer resonator and the second wireless power transfer resonator are coupled to one another by a crossover junction that ensures that zero net magnetic flux passes through the second tile.

16. The wireless power device of claim 15, further comprising:
    at least a third tile of the array that has at least a second wireless power transfer resonator, a third wireless power transfer resonator, and a fourth wireless power transfer resonator disposed thereon, wherein the first wireless power transfer resonator, the second wireless power transfer resonator, the third wireless power transfer resonator, and the fourth wireless power transfer resonator disposed on the third tile are coupled to one another by a crossover junction that ensures that zero net magnetic flux passes through the third tile.

17. The wireless power device of claim 7, further comprising:
    at least a second RF power source electrically coupled to at least a second wireless power transfer resonator, the second RF power source being disposed on or in the tile that said second wireless power transfer resonator is disposed in or on, wherein the first and second RF power sources are separated from one another by a preselected distance.

18. The array wireless power device of claim 17, wherein:
    adjacent tiles in the array of tiles are separated from one another by a preselected gap, the preselected gap being preselected to ensure a sufficiently strong mutual inductance between wireless power transfer resonators of the adjacent tiles;
    each rectangular loop has a width that is preselected based at least in part on a tolerance in the size of the gap; and
    the first and second RF sources are in phase with one another.

19. The wireless power device of claim 7, wherein:
    the wireless power device comprises a first tile of the array and a second tile of the array;
    the wireless power transfer resonator of the first tile of the array is a first wireless power transfer resonator;
    the wireless power transfer resonator of the second tile of the array is a second wireless power transfer resonator;
    the first wireless power resonator and the second wireless power transfer resonator are at least one of inductively and electrically coupled to one another such that zero net magnetic flux passes through the second tile of the array.

20. The wireless power device of claim 7, further comprising:
    at least a second tile of the array that has a wireless power transfer resonator disposed thereon, wherein the wireless power transfer resonator is arranged so as to produce a first region or regions with positive magnetic flux through the surface of the tile and a second region or regions with negative magnetic flux through the surface of the tile, where the net magnetic flux passing through the tile is zero.

21. An electronic device, comprising:
    a plurality of tiles, wherein each of the plurality of tiles comprises:
        a substrate having a front surface and a back surface;
        a wireless power transfer resonator disposed in or on a respective one of the plurality of tiles, the wireless power transfer resonator having a preselected characteristic frequency and generating an electromagnetic (EM) field; and
        a wireless power receiver device disposed in or on the respective one of the plurality of tiles, the wireless power receiver device being tuned to the preselected characteristic frequency such that the EM field generated by the wireless power transfer resonator is inductively coupled to the wireless power receiver device,
        wherein the wireless power transfer resonator of a first one of the plurality of tiles is tuned to a first preselected characteristic frequency and the wireless power transfer resonator of a second one of the plurality of tiles is tuned to a second preselected frequency different than the first preselected characteristic frequency, the first preselected characteristic frequency and the second preselected frequency preselected such that a substantially constant electromagnetic field is generated across an array of the plurality of tiles, and
        wherein the first preselected characteristic frequency and the second first preselected characteristic frequency are each preselected based on at least one of a number of nearest neighbor tiles, a coupling coefficient, and a desired frequency of oscillation of the array of the plurality of tiles.

\* \* \* \* \*